(12) United States Patent
Kotsuji

(10) Patent No.: US 11,772,171 B2
(45) Date of Patent: Oct. 3, 2023

(54) POWER TOOL

(71) Applicant: MAKITA CORPORATION, Anjo (JP)

(72) Inventor: Takafumi Kotsuji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 132 days.

(21) Appl. No.: 17/155,712

(22) Filed: Jan. 22, 2021

(65) Prior Publication Data
US 2021/0252667 A1 Aug. 19, 2021

(30) Foreign Application Priority Data

Feb. 13, 2020 (JP) .................................. 2020-022029

(51) Int. Cl.
*B23B 31/18* (2006.01)
*B24B 45/00* (2006.01)
(Continued)

(52) U.S. Cl.
CPC .............. *B23B 31/18* (2013.01); *B23B 31/10* (2013.01); *B24B 45/006* (2013.01); *B27B 5/30* (2013.01); *B23D 61/006* (2013.01); *B24B 23/04* (2013.01)

(58) Field of Classification Search
CPC ......... B23B 31/10; B23B 31/18; B23B 31/19; B24B 23/04; B24B 45/006; B23D 61/006;
(Continued)

(56) References Cited

U.S. PATENT DOCUMENTS 3,233,908 A 2/1966 Schwarzmayr et al.
3,622,170 A 11/1971 Sedgwick
(Continued)

FOREIGN PATENT DOCUMENTS

CN 1966215 A 5/2007
CN 103415374 A 11/2013
(Continued)

OTHER PUBLICATIONS

Office Action and Search Report from the Chinese Patent Office dated Apr. 14, 2023 in counterpart application No. CN202011596306.X, and translation thereof.

*Primary Examiner* — Eric A. Gates
(74) *Attorney, Agent, or Firm* — J-TEK LAW PLLC; Jeffrey D. Tekanic; Scott T. Wakeman

(57) ABSTRACT

A power tool includes a spindle, holding members each having a claw, a biasing member, and a locking member. The holding members are movable between a first position, in which the holding members fixedly hold a tool accessory against a tool mounting part of the spindle with the claws pressed against the tool accessory owing to a biasing force of the biasing member, and a second position, in which the holding members do not impede or block attachment or detachment of the tool accessory. The locking member is configured to move between a locking position, in which the locking member abut on the claws of the holding members to hold the holding members in the second position, and an unlocking position, in which the locking member does not impede or block the holding members from moving from the second position to the first position.

20 Claims, 13 Drawing Sheets

(51) Int. Cl.
  *B23B 31/10*    (2006.01)
  *B27B 5/30*    (2006.01)
  *B23D 61/00*    (2006.01)
  *B24B 23/04*    (2006.01)

(58) Field of Classification Search
  CPC .......... B27B 5/30; B27B 5/32; B27B 19/006;
              Y10T 279/1095; Y10T 279/18
  See application file for complete search history.

(56) References Cited

U.S. PATENT DOCUMENTS

| | | | |
|---|---|---|---|
| 3,998,467 A | 12/1976 | Petkovich | |
| 4,205,572 A | 6/1980 | Weiner | |
| 4,237,659 A | 12/1980 | Welsch et al. | |
| 4,597,227 A | 7/1986 | Gentischer et al. | |
| 4,747,607 A | 5/1988 | Emter | |
| 4,989,374 A | 2/1991 | Rudolf et al. | |
| 5,031,361 A | 7/1991 | MacKay, Jr. | |
| 5,157,873 A | 10/1992 | Rudolf et al. | |
| 5,263,283 A | 11/1993 | Rudolf et al. | |
| 5,423,358 A | 6/1995 | Rautio | |
| 5,468,176 A | 11/1995 | Udert et al. | |
| 5,573,255 A | 11/1996 | Salpaka | |
| 5,575,071 A | 11/1996 | Phillips et al. | |
| 5,601,483 A | 2/1997 | Rudolf et al. | |
| 5,639,273 A | 6/1997 | Sjolander et al. | |
| 5,658,193 A | 8/1997 | McCambridge | |
| 5,727,994 A | 3/1998 | Sjolander et al. | |
| 5,759,093 A | 6/1998 | Rodriguez | |
| 5,919,085 A | 7/1999 | Izumisawa | |
| 5,946,810 A | 9/1999 | Hoelderlin et al. | |
| 6,142,858 A | 11/2000 | Luedeke | |
| 6,244,943 B1 | 6/2001 | Böhler et al. | |
| 6,569,001 B2 | 5/2003 | Rudolf et al. | |
| 6,612,039 B2 | 9/2003 | Kakiuchi et al. | |
| 6,623,202 B2 | 9/2003 | Hansson et al. | |
| 6,735,876 B2 | 5/2004 | Hirabayashi | |
| 6,796,888 B2 | 9/2004 | Jasch | |
| 6,860,792 B2 | 3/2005 | Krondorfer et al. | |
| 6,887,142 B2 | 5/2005 | Rupprecht et al. | |
| 6,910,694 B2 | 6/2005 | Hartmann et al. | |
| 7,344,435 B2 | 3/2008 | Pollak et al. | |
| 7,497,860 B2 | 3/2009 | Carusillo et al. | |
| 7,537,065 B2 | 5/2009 | Gallagher et al. | |
| 7,719,146 B2 | 5/2010 | Takahashi et al. | |
| 7,789,737 B2 | 9/2010 | Liersch | |
| 7,997,586 B2 | 8/2011 | Ziegler et al. | |
| 8,042,437 B2 | 10/2011 | Maier et al. | |
| 8,113,520 B2 | 2/2012 | Zaiser et al. | |
| 8,181,973 B2 | 5/2012 | Dezheng et al. | |
| 8,182,316 B2 | 5/2012 | Peisert | |
| 8,187,058 B2 | 5/2012 | Blickle et al. | |
| 8,272,135 B2 | 9/2012 | Zhou | |
| 8,317,574 B2 | 11/2012 | Blickle et al. | |
| 8,641,049 B2 | 2/2014 | Marini et al. | |
| 8,851,960 B2 | 10/2014 | Ikuta | |
| 8,895,880 B2 | 11/2014 | Mizutani et al. | |
| 9,073,563 B2 | 7/2015 | Middleton et al. | |
| 9,108,255 B2 | 8/2015 | Li | |
| 9,120,216 B2 | 9/2015 | Zhang et al. | |
| 9,221,156 B2 | 12/2015 | Bachman et al. | |
| 9,486,887 B2* | 11/2016 | Fankhauser | B23Q 3/12 |
| 9,555,554 B2 | 1/2017 | Thorson et al. | |
| 9,694,472 B2* | 7/2017 | Luescher | B23B 31/18 |
| 9,737,969 B2 | 8/2017 | Bek et al. | |
| 10,052,695 B2* | 8/2018 | Klabunde | B23B 31/008 |
| 10,179,381 B2* | 1/2019 | Luescher | B24B 45/006 |
| 10,213,852 B2 | 2/2019 | Qian et al. | |
| 10,828,742 B2* | 11/2020 | Luescher | B24B 23/022 |
| 11,052,564 B2* | 7/2021 | Fellmann | B23B 51/0473 |
| 11,364,545 B2 | 6/2022 | Aoki | |
| 11,422,512 B2* | 8/2022 | Hauser | G04D 3/0209 |
| 11,590,593 B2 | 2/2023 | Aoki | |
| 2002/0035882 A1 | 3/2002 | Hartmann | |
| 2002/0070037 A1 | 6/2002 | Jasch | |
| 2002/0170408 A1 | 11/2002 | Hartmann et al. | |
| 2003/0100251 A1 | 5/2003 | Besch | |
| 2005/0075059 A1 | 4/2005 | Kausch et al. | |
| 2005/0095966 A1 | 5/2005 | Jasch et al. | |
| 2005/0156390 A1 | 7/2005 | Marini et al. | |
| 2006/0172669 A1 | 8/2006 | Hesse et al. | |
| 2007/0060030 A1 | 3/2007 | Pollak et al. | |
| 2007/0082590 A1 | 4/2007 | Kraenzler et al. | |
| 2007/0295156 A1 | 12/2007 | Ziegler et al. | |
| 2009/0023371 A1 | 1/2009 | Blickle et al. | |
| 2009/0273146 A1 | 11/2009 | Dezheng et al. | |
| 2010/0197208 A1 | 8/2010 | Blickle et al. | |
| 2010/0236806 A1 | 9/2010 | Heilig et al. | |
| 2011/0074122 A1 | 3/2011 | Marini et al. | |
| 2011/0086582 A1 | 4/2011 | Takemura et al. | |
| 2011/0316241 A1 | 12/2011 | Zhang et al. | |
| 2011/0316242 A1 | 12/2011 | Zhang et al. | |
| 2012/0067607 A1 | 3/2012 | Weber et al. | |
| 2012/0139196 A1 | 6/2012 | Zhou | |
| 2012/0169018 A1 | 7/2012 | Lu et al. | |
| 2013/0047762 A1 | 2/2013 | Hecht et al. | |
| 2013/0193653 A1 | 8/2013 | Marini et al. | |
| 2014/0084552 A1 | 3/2014 | Zieger et al. | |
| 2014/0110908 A1 | 4/2014 | Fankhauser et al. | |
| 2014/0158391 A1 | 6/2014 | Xin et al. | |
| 2014/0191481 A1 | 7/2014 | Kawakami et al. | |
| 2014/0290072 A1 | 10/2014 | Brown et al. | |
| 2015/0042052 A1 | 2/2015 | Furusawa et al. | |
| 2016/0184956 A1 | 6/2016 | Klabunde et al. | |
| 2016/0199919 A1 | 7/2016 | Klabunde et al. | |
| 2016/0221085 A1 | 8/2016 | Zhong et al. | |
| 2016/0221175 A1 | 8/2016 | Aoki | |
| 2016/0271711 A1 | 9/2016 | Qian et al. | |
| 2016/0288288 A1 | 10/2016 | Klabunde et al. | |
| 2017/0050291 A1 | 2/2017 | Aoki | |
| 2017/0080545 A1 | 3/2017 | Furusawa et al. | |
| 2017/0239802 A1 | 8/2017 | Aoki | |
| 2018/0243894 A1 | 8/2018 | Wang et al. | |
| 2018/0319001 A1 | 11/2018 | Zhong et al. | |
| 2019/0030616 A1 | 1/2019 | Hess et al. | |
| 2019/0299387 A1 | 10/2019 | Kotsuji et al. | |
| 2020/0016733 A1 | 1/2020 | Furusawa et al. | |
| 2020/0230776 A1* | 7/2020 | Sinzig | B24B 45/006 |
| 2021/0162525 A1 | 6/2021 | Aoki | |
| 2021/0162526 A1 | 6/2021 | Aoki | |
| 2021/0197290 A1 | 7/2021 | Aoki | |

FOREIGN PATENT DOCUMENTS

| | | | |
|---|---|---|---|
| CN | 203936883 U | 11/2014 | |
| CN | 103338713 B | 6/2016 | |
| CN | 110712181 A | 1/2020 | |
| DE | 29605728 U1 | 9/1996 | |
| DE | 102005047400 | 12/2006 | |
| DE | 102005031802 A1 | 1/2007 | |
| DE | 102011005021 A1 | 9/2012 | |
| DE | 102011005818 A1 | 9/2012 | |
| DE | 102017214119 A1 * | 2/2019 | ............ B23B 31/10 |
| DE | 102020110218 A1 * | 10/2021 | ........... B24B 23/028 |
| EP | 1790434 A1 | 5/2007 | |
| EP | 1790434 B1 | 3/2008 | |
| EP | 1737616 B1 | 12/2011 | |
| JP | 2016144862 A | 8/2016 | |
| JP | 2016529118 A | 9/2016 | |
| JP | 2017039180 A | 2/2017 | |
| JP | 2017144538 A | 8/2017 | |
| KR | 101759303 B1 * | 7/2017 | |
| WO | 2012007203 A1 | 1/2012 | |
| WO | 2015027933 A1 | 3/2015 | |
| WO | WO-2019030058 A1 * | 2/2019 | ........... B24B 23/022 |

* cited by examiner

POWER TOOL

CROSS-REFERENCE TO RELATED APPLICATIONS

The present application claims priority to Japanese patent application No. 2020-22029 filed on Feb. 13, 2020, the contents of which are hereby fully incorporated herein by reference.

TECHNICAL FIELD

The present disclosure relates to a power tool that is configured to perform a processing operation on a workpiece by driving a tool accessory in an oscillating manner.

BACKGROUND

Known power tools (such as so-called oscillating power tools or oscillating multi-tools) are configured perform a processing operation on a workpiece by driving a tool accessory that is fixed to a spindle in a pivotal oscillating manner within a specified angle range. A variety of structures for fixing (attaching) the tool accessory to the spindle have been disclosed and put into commercial usage.

SUMMARY

In one aspect of the present disclosure, a power tool (e.g., an oscillating multi-tool) is configured to perform a processing operation on a workpiece by driving a tool accessory in an oscillating manner. The power tool may include, e.g., a spindle, a plurality of holding members (or tool accessory holders, hereinafter simply "holding members"), a moving mechanism and a locking member (or sleeve, hereinafter simply "locking member"). The spindle is configured to be driven about a driving axis with a pivotal oscillating motion within a specified angle range. The driving axis defines an up-down direction of the oscillating multi-tool. A tool mounting part, to which the tool accessory is removably attachable, is defined at a lower end portion of the spindle. Each of the holding members has a surface for contacting and pressing against the tool accessory, such as a claw, a flange, a clamping surface, a clamp jaw, etc. (hereinafter simply "claw"). The holding members are movable between a first position, in which the claws of the holding members are located farther or spaced apart from each other, and a second position, in which the claws of the holding members are located closer to each other than in the first position. The moving mechanism is configured to move (e.g., pivot) the holding members between the first position and the second position. The moving mechanism includes a biasing member (e.g., a spring) configured to bias the holding members toward the first position. The locking member (or sleeve) is configured to move between a locking position, in which the locking member (or a sleeve, herein after simply "locking member") holds (or locks, blocks, impedes, etc.) the holding members in the second position, and an unlocking position, in which the locking member allows (or does not block or impede) the holding members to move from the second position to the first position. When the holding members are in the first position, the holding members fixedly hold the tool accessory against (relative to) the tool mounting part with the claws pressed against (or locked to) the tool accessory owing to a biasing force of the biasing member. When the holding members are in the second position, the holding members enable (or do not block or impede) the tool accessory to be attached to and detached from the tool mounting part. When the locking member is in the locking position, the locking member is configured to hold (or lock) the holding members in the second position by abutting on the claws of the holding members.

To hold or lock the holding members in the second position in this aspect, the power tool may be designed such that, e.g., (i) the claws of the holding members, while located (disposed) in the second position, continuously abut on the locking member, whereby the holding members are at least substantially immovable away from the second position, and (ii) the holding members can slightly move away from the second position but can not reach the first position owing to an abutment of the claws on the locking member, thereby retaining the holding members substantially in or close to the second position.

The oscillating multi-tool according to this aspect includes the holding members that are configured to both: (i) fixedly hold the tool accessory relative to the tool mounting part when the claws are opened (spaced apart from each other), while also (ii) allowing the tool accessory to be attached to and detached from the tool mounting part when the claws are closed (disposed close to each other). In other words, the oscillating multi-tool includes the holding members for the tool accessory that are configured to be opened and closed. Further, the oscillating multi-tool includes the locking member that is configured to hold (or lock) the holding members in the second position, or substantially in the second position, by blocking (abutting) the claws when the locking member is in the locking position. Thus, the locking member can securely (stably) retain the holding members in the second position with the claws closed, even though the biasing member always biases the holding members toward the first position where the claws would be opened (spaced apart).

DETAILED DESCRIPTION OF THE EMBODIMENTS

Non-limiting, representative embodiments of the present disclosure are now described with reference to the drawings.

First Embodiment

A first embodiment is described with reference to FIGS. 1 to 8. In this embodiment, an oscillating multi-tool 1A is described as an exemplary example of a power tool that is configured to perform a processing operation on a workpiece (not shown) by driving a tool accessory 91 in an oscillating manner within a specified angular range, e.g., that is less than 5°. Various kinds of tool accessories (e.g., a blade, a scraper, a grinding pad, a polishing pad, etc.) 91 are available as tool accessories 91 that are selectively attachable to the oscillating multi-tool 1A. A user can select one of the tool accessories 91 that is suitable for a desired processing operation (e.g., cutting, scraping, grinding, polishing, etc.), and attach the selected tool accessory 91 to the oscillating multi-tool 1A.

Figure 1:
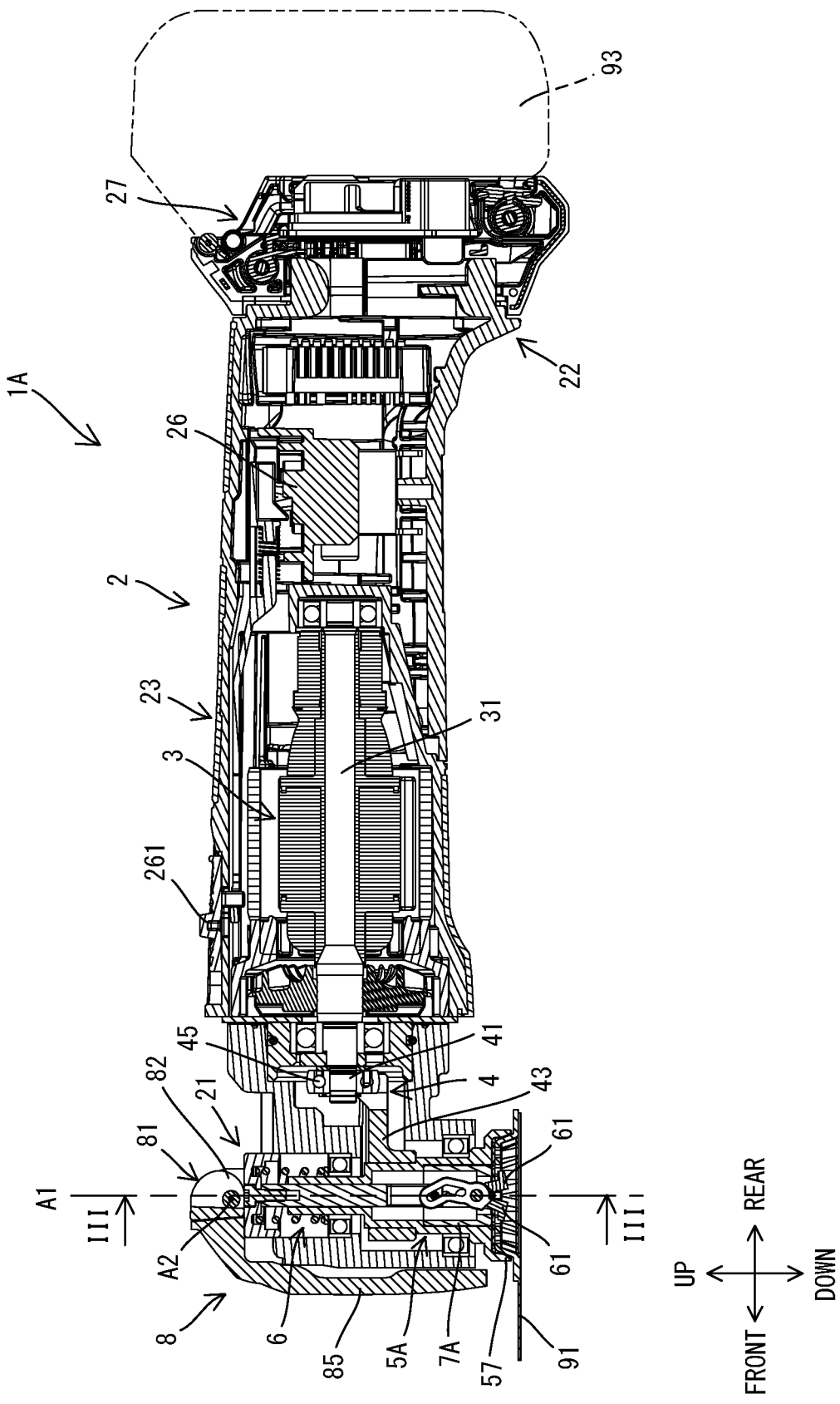
FIG. 1 is a sectional view showing an oscillating multi-tool according to a first embodiment, wherein an actuating member is located in a clamping position.

First, the general structure of the oscillating multi-tool 1A is described. As shown in FIG. 1, the oscillating multi-tool 1A has an elongate housing (also referred to as a tool body) 2. A spindle 5A, a motor 3 and a driving mechanism 4 are disposed within the housing 2. The spindle 5A is housed in one end portion of the housing 2 in its longitudinal direction. The spindle 5A is disposed along a driving axis A1 that intersects (more specifically, at least substantially orthogonally intersects) a longitudinal axis of the housing 2. One (lower) axial end portion of the spindle 5A protrudes from the housing 2 and is exposed outside of the housing 2. This end portion (lower axial end portion) forms (defines) a tool mounting part 57 to (on) which the tool accessory 91 is removably mounted. Further, a battery (also referred to as a battery pack or battery cartridge) 93 for supplying electric current to the motor 3 is removably mounted to (on) the other end portion of the housing 2 in the longitudinal direction. The spindle 5A is configured to be driven about the driving axis A1 with a rotary (pivotal) oscillating motion within a specified angle range, using power that is generated by the motor 3 and transmitted to the spindle 5A via the driving mechanism 4. The tool accessory 91 that is mounted (coupled, attached) to (on) the spindle 5A is oscillated within the specified angle range, so that a processing operation is performed on a workpiece.

For the sake of convenience in the following description, the directions of the oscillating multi-tool 1A are related in the following manner. An extension direction of the driving axis A1 is defined as an up-down direction. In the up-down direction, the side on which the tool mounting part 57 of the spindle 5A is located is defined as a lower side of the oscillating multi-tool 1A, while the opposite side is defined as an upper side of the oscillating multi-tool 1A. A direction that is orthogonal to the driving axis A1 and that corresponds to the longitudinal direction of the housing 2 is defined as a front-rear direction. In the front-rear direction, the side of one end portion of the housing 2 in which the spindle 5A is housed is defined as a front side of the oscillating multi-tool 1A, while the side of the other end portion on which the battery 93 is mounted is defined as a rear side of the oscillating multi-tool 1A. Further, a direction that is orthogonal to both the driving axis A1 and the longitudinal axis of the housing 2 is defined as a left-right direction.

The detailed structure of the oscillating multi-tool 1A is now described.

First, the housing 2 is described. As shown in FIG. 1, the housing 2 is an elongate housing that forms an outer shell of the oscillating multi-tool 1A. The spindle 5A, a tool holding mechanism 6 and a locking member (sleeve) 7A are housed in a front end portion of the housing 2. The motor 3 is housed in a substantially central portion of the housing 2. The driving mechanism 4 is housed between the motor 3 and the spindle 5A in the housing 2. The central portion of the housing 2 forms (defines) a grip part 23 that is configured to be held by a user. A slidable manipulation part (slide switch or switch knob) 261 is provided on a top of the housing 2. The manipulation part 261 is configured to be manipulated by a user while holding the grip part 23. The manipulation part 261 is configured to switch ON and OFF a switch 26 that is housed within a rear portion of the housing 2. In this embodiment, the motor 3 is driven while the switch 26 is ON.

A release lever 8 is supported at an upper portion of a front part 21 of the housing 2. The release lever 8 includes a rotary shaft 81 and a manipulation part 85. The rotary shaft 81 extends in the left-right direction and is rotatably (pivotably) supported by the housing 2. A rotational axis A2 of the rotary shaft 81 extends in the left-right direction. The release lever 8 is a so-called cam lever and has an eccentric part (cam) 82 that is eccentric to the rotational axis A2. The manipulation part 85 has an elongate rod-like (bar-like) shape that is configured to be held (grasped) by a user. The manipulation part 85 extends in a direction that intersects the rotational axis A2 from a central portion of the rotary shaft 81 in the left-right direction. The rotary shaft 81 rotates (pivots) together with the manipulation part 85 in response to manual pivoting (rotation) of the manipulation part 85.

In this embodiment, the release lever 8 is pivotable in a clockwise direction as viewed from the left (or in an upward direction) from an initial position, in (at) which the manipulation part 85 abuts on a front surface of the front part 21 as shown in FIG. 1, to a position in (at) which the manipulation part 85 extends upward from the rotary shaft 81 (hereinafter referred to as an upper position). In response to the act of pivoting the manipulation part 85 upward from the initial position, fixing of the tool accessory 91 relative to the spindle 5A is released (that is, the tool accessory 91 is unclamped), as will be described in detail below. Accordingly, the direction in which the manipulation part 85 is pivoted upward from the initial position is hereinafter referred to as an unclamping direction. Further, the act of manually pivoting the manipulation part 85 in this unclamping direction is hereinafter referred to as an unclamping operation. Unclamping of the tool accessory 91 in response to the unclamping operation performed on the release lever 8 will be described in detail below.

A battery mounting part 27 is provided in (on) a rear end part 22 of the housing 2. The battery mounting part 27 has an engagement structure (e.g., parallel slide rails) for sliding engagement with the rechargeable battery 93, and terminals that are electrically connectable to corresponding terminals of the battery 93 when the battery 93 is engaged with the engagement structure. The structures of the battery mounting part 27 and the battery 93 themselves are well known and therefore not described herein.

Structures (elements), in particular the motor 3, the spindle 5A, the driving mechanism 4, the tool holding mechanism 6 and the locking member 7A, that are disposed in the housing 2 are now described in this order.

As shown in FIG. 1, the motor 3 is arranged such that a rotational axis of a motor shaft 31 extends orthogonally to the driving axis A1 of the spindle 5A. Specifically, the rotational axis of the motor shaft 31 extends in the front-rear direction along the longitudinal axis of the housing 2.

The spindle 5A is now described.

Figure 2:
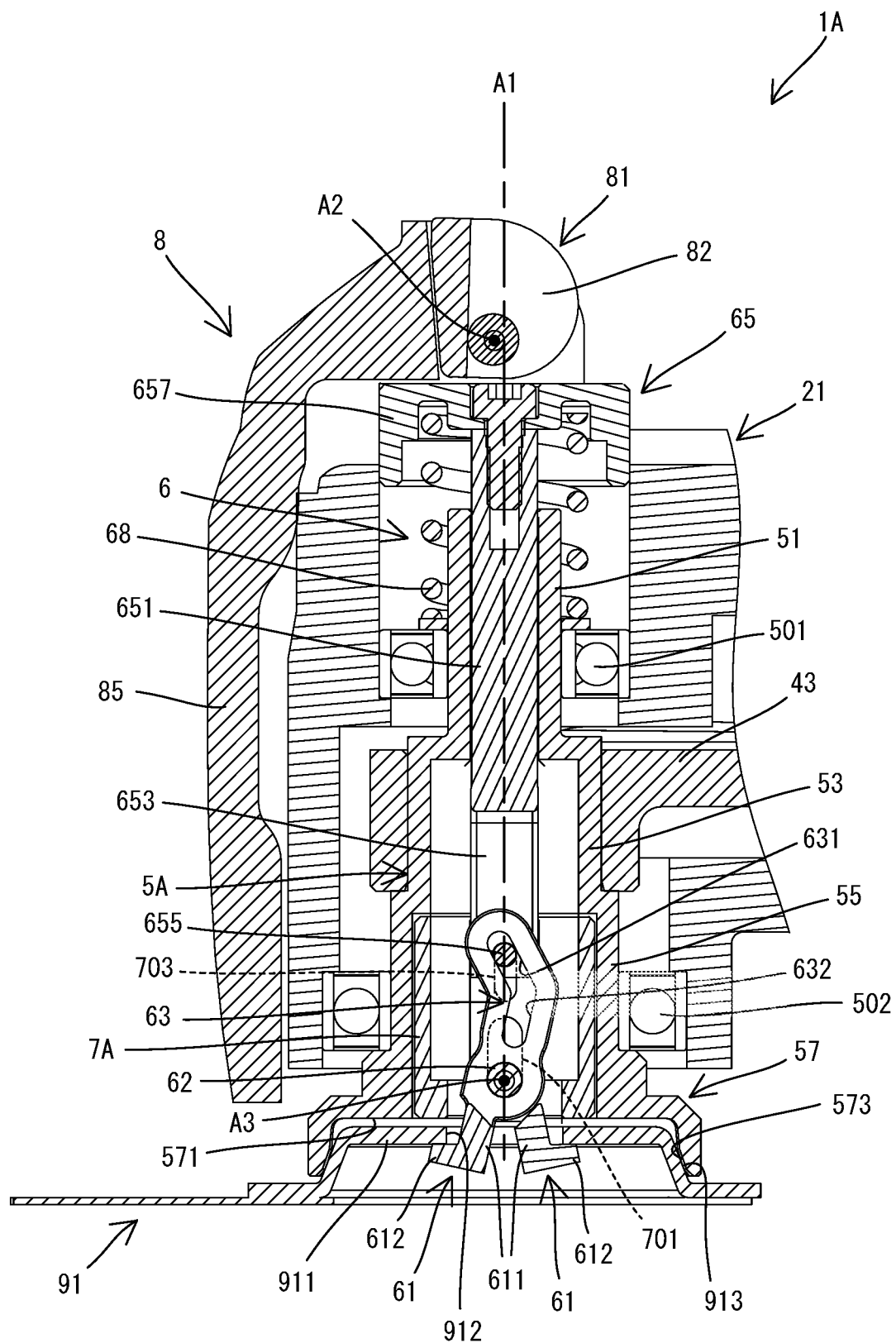
FIG. 2 is a partial, enlarged view of FIG. 1.
Figure 3:
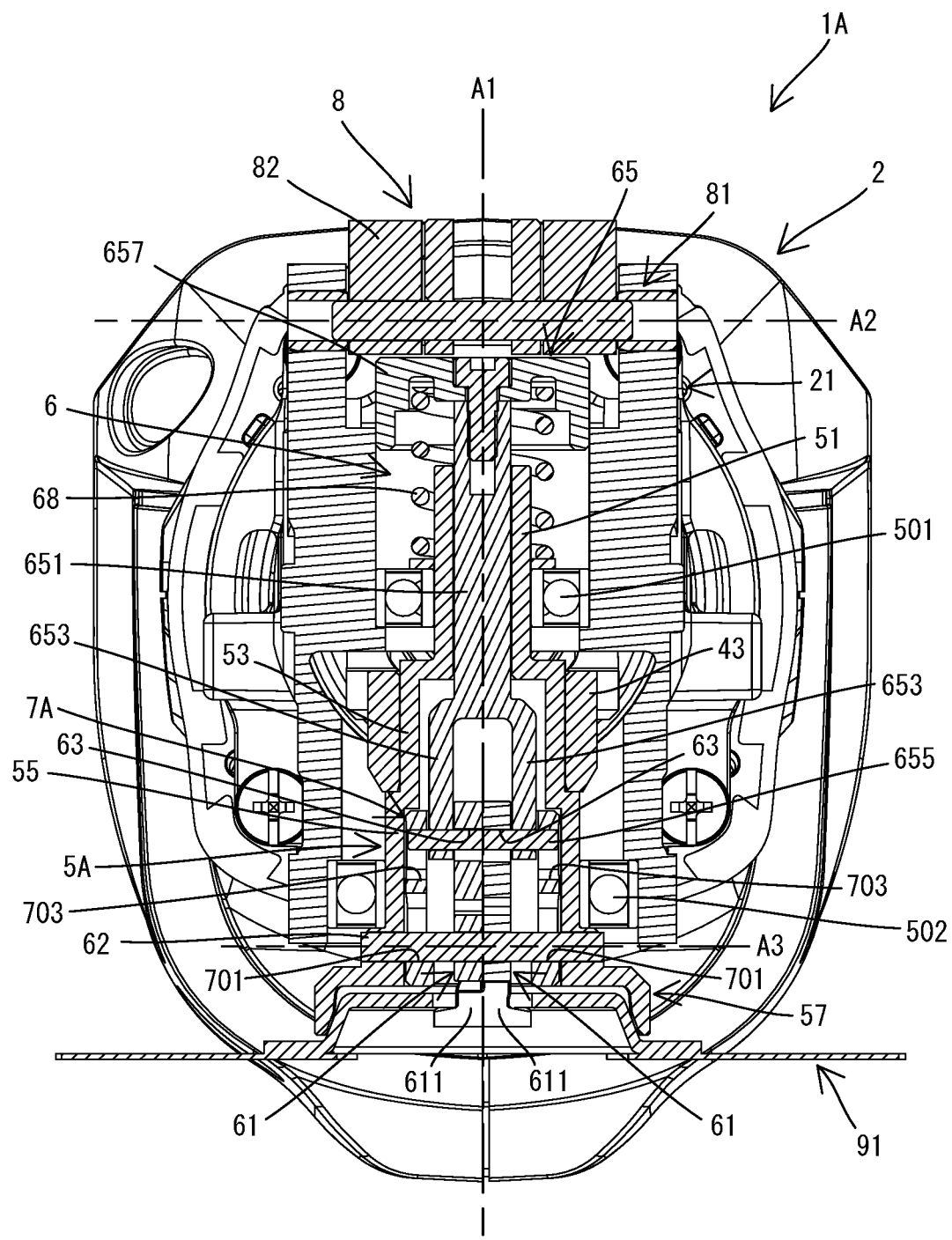
FIG. 3 is a sectional view taken along line III-III in FIG. 1.

As shown in FIGS. 2 and 3, the spindle 5A is supported in the front end part 21 of the housing 2 so as to be rotatable (pivotable) around the driving axis A1. More specifically, the spindle 5A is supported by two bearings 501, 502 that are held in the housing 2. One end portion of an oscillating arm 43 is fixed onto an outer periphery of the spindle 5A between the bearings 501, 502. A lower portion (a portion below the lower bearing 502) of the spindle 5A is exposed outside of the housing 2. An upper end portion of the spindle 5A protrudes upward from the upper bearing 501 within the housing 2.

The spindle 5A is a hollow stepped cylindrical member. In this embodiment, the spindle 5A includes a small-diameter part 51, a medium-diameter part 53, a large-diameter part 55 and the tool mounting part 57 in this order from the top.

The small-diameter part 51 has the smallest diameter in the spindle 5A. The upper bearing 501 is fitted around a lower end portion of the small-diameter part 51. A shaft part 651 of an actuating member 65 of the tool holding mechanism 6 slidably extends through the small-diameter part 51, as will be described in detail below. The medium-diameter part 53 extends downward from a lower end of the small-diameter part 51 and has a larger diameter than the small-diameter part 51. The large-diameter part 55 extends downward from a lower end of the medium-diameter part 53 and has a larger diameter than the medium-diameter part 53. The lower bearing 502 is fitted around a lower end portion of the large-diameter part 55. The actuating member 65 and holding members (tool accessory holders) 61 of the holding mechanism 6 are partially disposed inside the medium-diameter part 53 and the large-diameter part 55, and the locking member 7A is also disposed inside the medium-diameter part 53 and the large-diameter part 55, as will be described in detail below.

The tool mounting part 57 is connected to a lower end of the large-diameter part 55 and protrudes radially outward like a flange. As shown in FIG. 2, the tool mounting part 57 has a recess 571, which is indented upwardly. A surface defining the recess 571 (an interior surface of the tool mounting part 57) includes an inclined surface (oblique surface) 573 that is inclined (oblique) downward and away from the driving axis A1 (i.e. in a radially outward direction). All of the tool accessories 91 that are attachable to the oscillating multi-tool 1A have a protruding part 911 that is configured to be fitted in (mated with) the recess 571 of the tool mounting part 57. A through hole 912 is formed in a central portion of the protruding part 911. Further, a portion of an upper surface of the tool accessory 91 that defines the protruding part 911 is formed as an inclined surface (oblique surface) 913, which conforms to (which is complementary to) the inclined surface 573. That is, the portion of the tool accessory 91 having the inclined surface 913 may also be formed, e.g., as a truncated cone that is complementary (matching) to the truncated cone of the tool mounting portion 41 so that the two truncated cones can be fitted or mated together to form a line contact (circular line contact or annular/ring contact) between the two mated parts. In this embodiment, the tool accessory 91 is fixedly held relative to the spindle 5A with the inclined surface 913 in abutment with the inclined surface 573.

The driving mechanism 4 is now described. The driving mechanism 4 is configured to pivotally oscillate the spindle 5A within a specified angle range around the driving axis A1, using the power generated by the motor 3. As shown in FIG. 1, the driving mechanism 4 of this embodiment includes an eccentric shaft 41, an oscillating arm 43 and a drive bearing 45. Because the driving mechanism 4 has a well known structure, it is therefore only briefly described here. The eccentric shaft 41 is connected to the motor shaft 31 and has an eccentric part that is eccentric to the rotational axis of the motor shaft 31. The drive bearing 45 is fitted around an outer periphery of the eccentric part. The oscillating arm 43 operably couples the drive bearing 45 to the spindle 5A. One end portion of the oscillating arm 43 is annular-shaped and is fixed around an outer periphery of the spindle 5A. The other end portion of the oscillating arm 43 is bifurcated (forked) and its two ends are disposed to abut on the left side and right side, respectively, of an outer periphery of the drive bearing 45.

The tool holding mechanism 6 is now described.

The tool holding mechanism 6 is configured to fixedly hold the tool accessory 91 relative to the spindle 5A. Further, the tool holding mechanism 6 is configured to release the fixing (attachment) of (i.e. to unclamp) the tool accessory 91 relative to the tool mounting part 57 in response to an unclamping operation being performed on the release lever 8. As shown in FIGS. 2 and 3, the tool holding mechanism 6 of this embodiment includes two holding members 61, the actuating member 65 and a biasing spring 68.

The holding members 61 are configured to engage with the tool accessory 91 to thereby hold (fix) the tool accessory 91 while pressing the tool accessory 91 against the tool mounting part 57. In this embodiment, the tool holding mechanism 6 has two such holding members 61. The two holding members 61 are supported by the spindle 5A via a common support pin 62 and are pivotable around a rotational axis (pivot axis) A3 that is orthogonal to the driving axis A1. The support pin 62 is supported above the tool mounting part 57 by a lower end portion of the large-diameter part 55 of the spindle 5A. One end portion of each of the holding members 61 that extends from the rotational axis A3 is formed like a hook or flange (cantilever extension) and has a claw (clamping surface) 612 on its distal end. The one end portion of the holding member 61 having the claw 612 on its distal end (i.e. the hook-shaped or flange-shaped end portion) is hereinafter referred to as a locking end portion 611. The two holding members 61 are arranged such that the locking end portions 611 protrude downward from a lower surface of the tool mounting part 57 (a top surface of the recess 571) and the claws 612 protrude (project, extend) away from each other.

Figure 4:
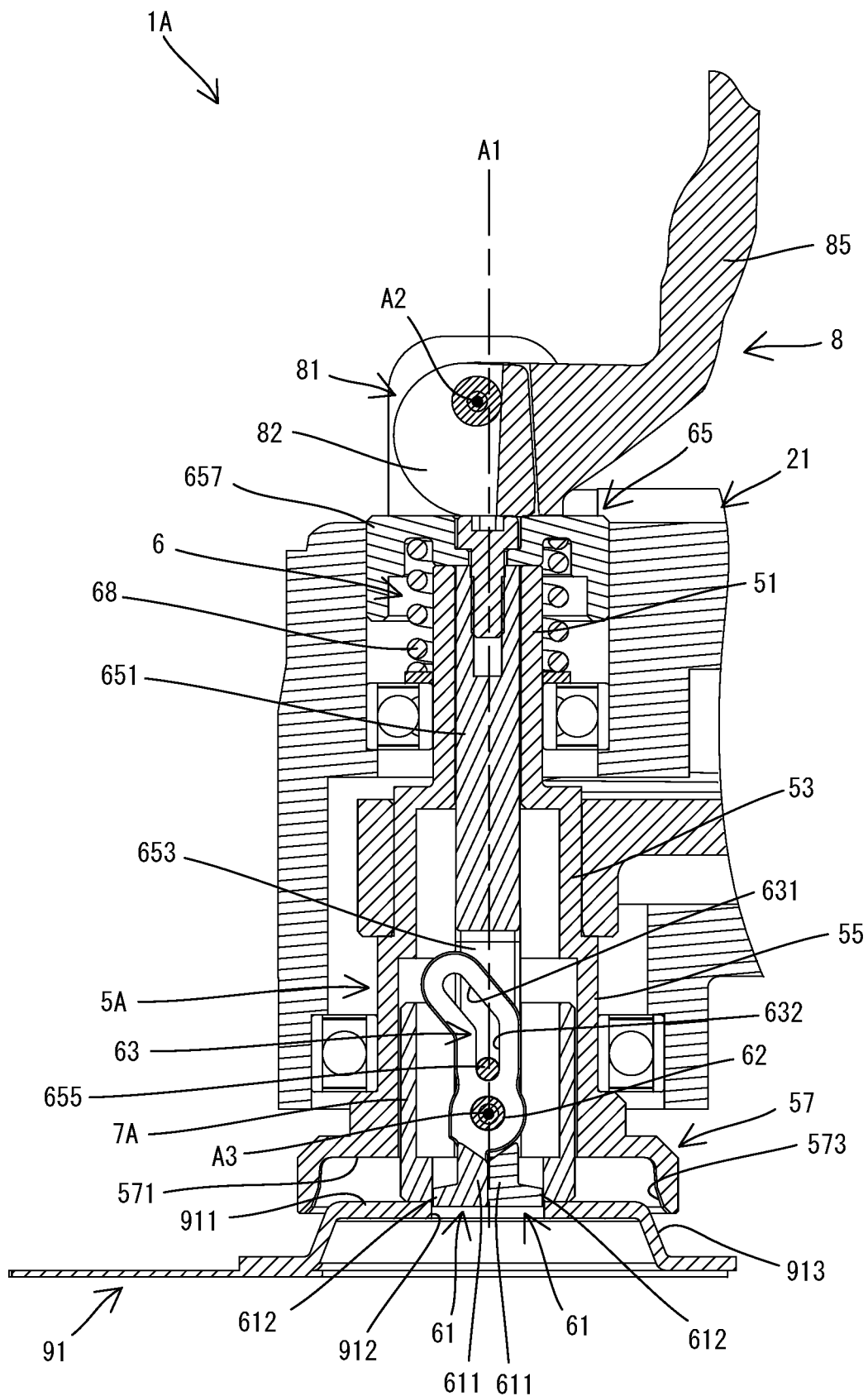
FIG. 4 is a sectional view that corresponds to FIG. 2, wherein the actuating member is located in a lowermost position.

The holding members 61 are pivotable in opposite directions with respect to each other between a first position, in (at) which the locking end portions 611 (and the claws 612) are located farther apart from each other (i.e., the locking end portions 611 (the claws 612) are open or spaced apart) as shown in FIG. 2, and a second position, in (at) which the locking end portions 611 (and the claws 612) are located closer to each other (i.e., the locking end portions 611 (the claws 612) are closed, i.e. they are in contact or nearly in contact) as shown in FIG. 4. Thus, the holding members 61 of this embodiment form a holding mechanism for the tool accessory 91 that is configured to be opened (spaced apart) and closed (close together); in other words, the holding members 61 are switchable (displaceable) between an open state (an open or fixing position) and a closed state (a closed or release position)).

As shown in FIG. 2, when the holding members 61 are placed in the first position in (at) which the locking end portions 611 are opened, the claws 612 are locked to (pressed against) a lower surface of the tool accessory 91 (specifically, a lower surface of the protruding part 911) around the through hole 912. Thus, the holding members 61 engage with (hold) the tool accessory 91. In this state, the locking end portions 611 are pivotably (rotatably) biased in directions away from each other (i.e., in directions in which the locking end portions 611 are further opened), so that the holding members 61 fixedly hold the tool accessory 91 relative to (against) the tool mounting part 57. Thus, the holding members 61 and the tool mounting part 57 clamp the tool accessory 91 therebetween. The first position (shown in FIG. 2) in (at) which the holding members 61 engage with (hold) the tool accessory 91 and fix the tool accessory 91 relative to (against) the tool mounting part 57 is hereinafter referred to as a fixing position.

As shown in FIG. 4, when the holding members 61 are placed in the second position in (at) which the locking end portions 611 are closed (close together), the claws 612 are located within a range (the circumference or diameter) of the through hole 912 of the tool accessory 91 when viewed from below and thus can pass through the through hole 912 in the up-down direction. Therefore, the holding members 61 allow the tool accessory 91 to be attached to and detached from the tool mounting part 57. Lower ends of the locking end portions 611 are located slightly above a lower end of the tool mounting part 57 within the recess 571. The second position (shown in FIG. 4) of the holding members 61 in (at) which the locking ends 611 can pass through the through hole 912 of the tool accessory 91 (i.e., the tool accessory 91 are attachable and detachable) is hereinafter referred to as a release position.

Further, each of the holding members 61 has a guide groove 63. The guide groove 63 is formed on the opposite side (upper side) from the locking end portion 611 with respect to the rotational axis A3. The guide groove 63 extends through the holding member 61 in a direction parallel to the rotational axis A3. The guide groove 63 is a slot having a substantially uniform width and is bent (angled) in the middle. More specifically, when each holding member 61 is located in the release position as shown in FIG. 4, a lower portion 632 of the guide groove 63 (a portion of the guide groove 63 that is closer to the rotational axis A3) extends substantially in the up-down direction (substantially in parallel to the driving axis A1). An upper portion 631 of the guide groove 63 extends obliquely upward from an upper end of the lower portion 632. More specifically, as the upper portion 631 extends upward, the upper portion 631 extends in the same direction as the protruding direction of the claw 612. Thus, the upper portion 631 is inclined (oblique) relative to the driving axis A1 when the holding member 61 is located in the release position.

As shown in FIGS. 2 and 3, the actuating member 65 has an elongate shape as a whole. The actuating member 65 is partially disposed within the spindle 5A and is movable along the driving axis A1 in the up-down direction relative to the spindle 5A. Further, the actuating member 65 is connected to the holding members 61 and configured to actuate the holding members 61 while moving in the up-down direction. The actuating member 65 is also connected to the locking member 7A, which will be described below, and configured to actuate the locking member 7A while moving in the up-down direction.

The actuating member 65 of this embodiment includes a shaft part 651, two support arms 653, an actuating pin 655 and a spring receiving part (spring seat) 657.

The shaft part 651 is an elongate circular rod-like portion. The shaft part 651 has a diameter that is substantially equal to (slightly smaller than) the inner diameter of the small-diameter part 51 of the spindle 5A. The shaft part 651 extends through the small-diameter part 51 so as to be slidable in the up-down direction. An upper end portion of the shaft part 651 protrudes upward from an upper end of the spindle 5A.

The two support arms 653 are branched from a lower end of the shaft part 651 and extend downward. The support arms 653 are disposed within the medium-diameter part 53 and the large-diameter part 55.

The actuating pin 655 is supported by lower end portions of the support arms 653. The actuating pin 655 extends in parallel to the support pin 62 above the support pin 62 that rotatably supports the holding members 61. Upper portions of the holding members 61 are arranged between the support arms 653, and the actuating pin 655 extends through the guide grooves 63 of the holding members 61. The actuating pin 655 has a diameter that is substantially equal to (slightly less than) the width of the guide grooves 63 and is slidable within the guide grooves 63. Both end portions of the actuating pin 655 protrude outward from the support arms 653 and are inserted into guide grooves 703 of the locking member 7A, respectively, as will be described below. Thus, the actuating pin 655 is movably (operably) connected (coupled) to the holding members 61 and the locking member 7A. The actuating pin 655 causes the holding members 61 to pivot and also causes the locking member 7A to move in the up-down direction while the actuating member 65 moves in the up-down direction, as will be described in detail below.

The spring receiving part 657 is a flange-like portion that is fixedly connected to an upper end portion of the shaft part 651. The spring receiving part 657 has an annular recess on its lower side that is configured to receive the biasing spring 68; i.e. an upper end of the biasing spring 68 contacts the annular recess.

The biasing spring 68 is a biasing member that is configured to bias the holding members 61 toward the fixing position. In this embodiment, the biasing spring 68 is configured to bias the holding members 61 toward the fixing position by biasing the actuating member 65 upward relative to the spindle 5A. The biasing spring 68 is a compression coil spring. The biasing spring 68 is disposed in a compressed state between an inner ring of the upper bearing 501 fitted around the small-diameter part 51 of the spindle 5A and the spring receiving part 657 of the actuating member 65. Therefore, the biasing spring 68 rotates (pivots) around the driving axis A1 together with the spindle 5A and the actuating member 65.

The locking member 7A is now described. The locking member 7A is configured to lock the holding members 61 in the release position to thereby prevent the holding members 61 from pivoting to the fixing position. More specifically, the locking member 7A is configured to be placed in (on) the paths of the claws 612 of the holding members 61 along which the claws 612 travel when the holding members 61 are pivoted from the release position to the fixing position. More specifically, the locking member 7A is capable of abutting on (configured to abut) the claws 612 to thereby block (inhibit, impede) the locking end portions 611 from opening (becoming spaced apart).

As shown in FIGS. 2 and 3, in this embodiment, the locking member 7A is formed as a hollow cylindrical sleeve. The locking member 7A is disposed inside the large-diameter part 55 of the spindle 5A. The locking member 7A has a substantially uniform outer diameter and is slidable in the up-down direction along an inner peripheral surface of the large-diameter part 55. Although not shown in detail, an annular elastic member is fitted around an outer periphery of the locking member 7A. The elastic member generates sliding resistance between the locking member 7A and the inner peripheral surface of the large-diameter part 55 when the locking member 7A moves in the up-down direction within the large-diameter part 55. The support arms 653 of the actuating member 65 and the holding members 61 are both partially disposed within the locking member 7A.

The locking member 7A is configured to abut on the claws 612 radially outward of the locking end portions 611. More specifically, the inner diameter of a lower end portion of the locking member 7A is set such that the claws 612 of the holding members 61 are substantially in contact with an inner peripheral surface of the lower end portion of the locking member 7A in the release position.

A pair of guide grooves (lower guide grooves or slots, i.e. lower slotted holes) 701 is formed in a lower portion of the locking member 7A such that the guide grooves 701 are diametrically opposite of each other across the driving axis A1. Each of the guide grooves 701 is an elongate slot extending in the up-down direction. The support pin 62, which is supported by the spindle 5A, is slidably inserted (movable) in the guide grooves 701. With such a structure, the locking member 7A is movable in the up-down direction relative to the spindle 5A within a range in which the support pin 62 is movable within the guide grooves 701.

More specifically, as shown in FIGS. 2 and 3, when the tool accessory 91 is clamped and the locking member 7A is located in its uppermost position relative to the spindle 5A, a lower end of the locking member 7A is located above the upper surface of the clamped tool accessory 91 and is thus incapable of contacting the holding members 61. Thus, the locking member 7A allows the holding members 61 to pivot; i.e. the locking member 7A does not block or impede the holding members 61 from pivoting to the open (spaced apart) position. Accordingly, this position of the locking member 7A, in (at) which the locking member 7A allows the holding members 61 to pivot, is also referred to as an unlocking position.

Figure 5:
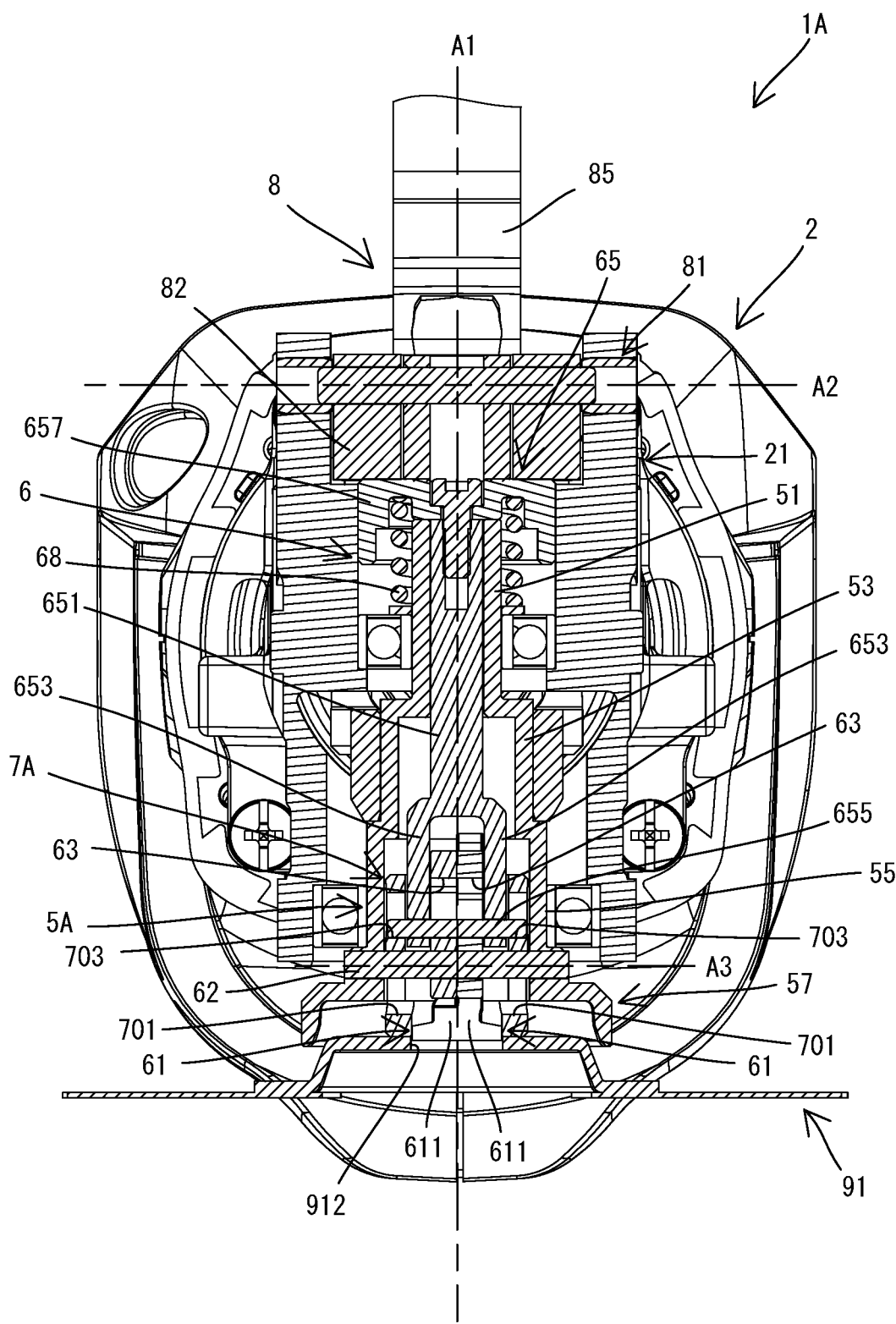
FIG. 5 is a sectional view that corresponds to FIG. 3, wherein the actuating member is located in the lowermost position.

On the other hand, as shown in FIGS. 4 and 5, when the locking member 7A is located in (at) its lowermost position, the lower end portion of the locking member 7A is located adjacent to and radially outward of the ends of the claws 612 of the holding members 61 that are located in the release position (in (at) which the locking end portions 611 are closed or closest together), and locks (holds) the holding members 61 in the release position. That is, the holding members 61 are blocked or impeded from pivoting away from each other. Accordingly, this position of the locking member 7A, in (at) which the locking member 7A locks the holding members 61 in the release position, is also referred to as a locking position. When the locking member 7A is located in the locking position, the lower end of the locking member 7A is located slightly above the lower end of the tool mounting part 57 within the recess 571.

When the locking member 7A is located in (at) the unlocking position, the support pin 62 (which is supported by the spindle 5A) is located within a lower end portion of each guide groove 701. On the other hand, the support pin 62 is located within an upper end portion of the guide groove 701 when the locking member 7A is located in (at) the locking position.

Furthermore, two guide grooves (upper guide grooves or slots, i.e. upper slotted holes) 703 are formed in the locking member 7A diametrically opposite of each other across the driving axis A1 and directly above the guide grooves 701 of the locking member 7A. Each of the guide grooves 703 is also an elongate slot extending in the up-down direction. The two end portions of the actuating pin 655 (which is supported by the support arms 653) are respectively inserted in the two guide grooves 703 so as to be slidable (movable) therein. With such a structure, the locking member 7A is movable in the up-down direction relative to the actuating member 65 within a range in which the actuating pin 655 is movable within the guide grooves 703.

In this embodiment, when the actuating member 65 moves in the up-down direction relative to the spindle 5A or when the locking member 7A is pressed by the tool accessory 91, the locking member 7A moves in the up-down direction between the locking position and the unlocking position. Furthermore, as was described above, when the actuating member 65 moves in the up-down direction, the holding members 61 are pivoted between the fixing position and the release position. In the oscillating multi-tool 1A, the actuating member 65, the holding members 61 and the locking member 7A are interlocked (operably coupled) with each other to unclamp and push down the tool accessory 91 in response to an unclamping operation being performed on the release lever 8, as well as to enable the tool accessory 91 to be attached with a single manual action (a so-called "one-touch operation"). Operations of the oscillating multi-tool 1A, including operations of the actuating member 65, the holding members 61 and the locking member 7A, are now described in further detail.

First, the state in which the tool accessory 91 is clamped is described.

As shown in FIGS. 2 and 3, when the tool accessory 91 is clamped, the actuating member 65 is biased by the biasing spring 68 and held in (at) a specified (predetermined) upper position (hereinafter also referred to as a clamping position). At this time, the release lever 8 is in (at) its initial position, and a portion (a small-diameter part) of the eccentric part 82 of the rotary shaft 81 that has a smaller diameter is spaced slightly apart upward from the actuating member 65 (the spring receiving part 657). The locking member 7A is supported in (at) the (its) unlocking position by the actuating pin 655 of the actuating member 65. Further, the actuating pin 655 is located in the upper portion 631 of the guide groove 63 of each holding member 61. Therefore, the holding members 61 are pivotably (rotatably) biased by the biasing spring 68 about the rotational axis A3 in the directions in which the locking end portions 611 move away from each other, and engage with (contact and hold) the tool accessory 91 and are held in the fixing position. The upper portion 631 is inclined, as described above, relative to the direction (upward direction) in which the actuating pin 655 is biased, so that the force that acts on the holding members 61 to pivot the the holding members 61 is amplified. Therefore, the claws 612 abut on the lower surface of the tool accessory 91 around the through hole 912, and strongly press the tool accessory 91 against the tool mounting part 57 with the inclined surface 913 in abutment with the inclined surface 573, thereby fixedly holding the tool accessory 91 against (relative to) the spindle 5A.

An operation for detaching (removing) the tool accessory 91 is now described.

In order to detach the tool accessory 91, the user manually pivots the release lever 8 in the unclamping direction by performing an unclamping operation on the manipulation part 85. In response to this unclamping operation, a portion (a large-diameter part) of the eccentric part 82 of the rotary shaft 81 that has a larger diameter abuts on an upper end of the actuating member 65 (the spring receiving part 657) from above and moves the actuating member 65 downward from the clamping position relative to the spindle 5A, while compressing the biasing spring 68. In response to the downward movement of the actuating member 65, the actuating pin 655 causes the holding members 61 to pivot in the directions in which the locking end portions 611 move toward each other (i.e., toward the release position), while sliding within the upper portions 631 of the guide grooves 63. The actuating pin 655 moves downward within the guide grooves 703 of the locking member 7A because the locking member 7A is held in the unlocking position by a frictional force of the elastic member (not shown).

Figure 6:
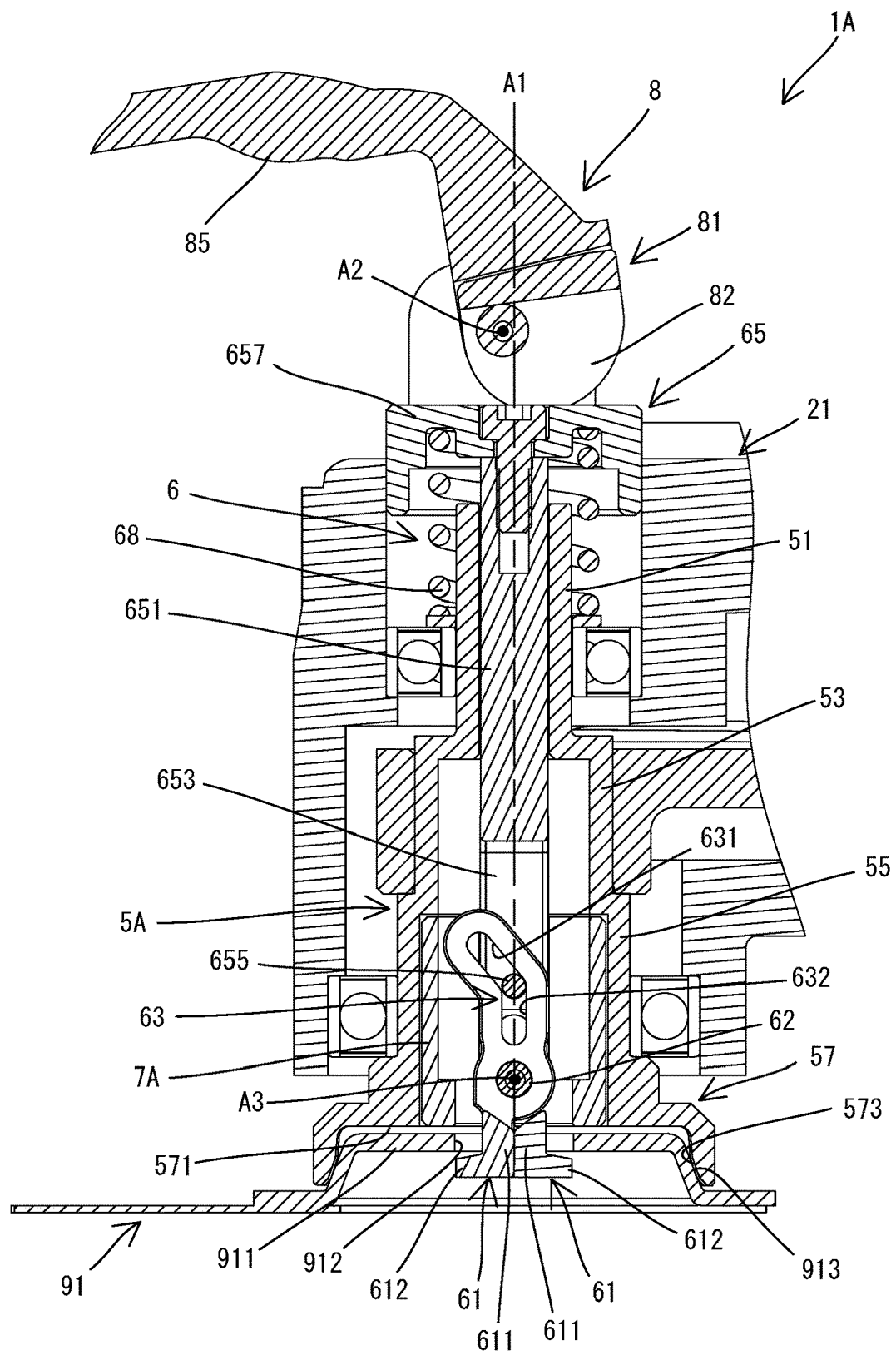
FIG. 6 is a sectional view that corresponds to FIG. 2, wherein the actuating member is located in a switching position.
Figure 7:
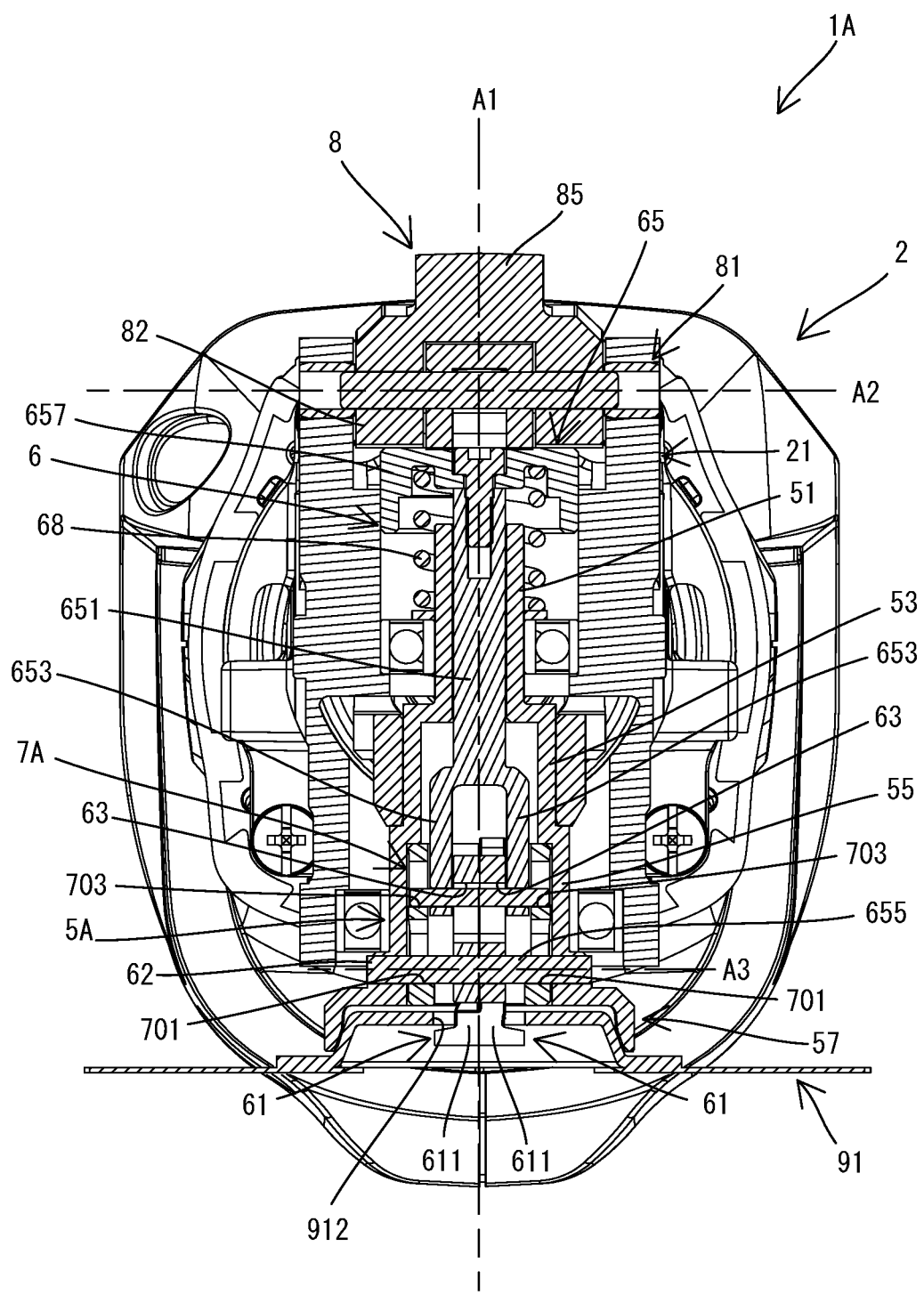
FIG. 7 is a sectional view that corresponds to FIG. 3, wherein the actuating member is located in the switching position.

As shown in FIGS. 6 and 7, the actuating pin 655 of the actuating member 65 moves downward relative to the spindle 5A while pivoting the holding members 61, and reaches a boundary (bent portion) between the upper portion 631 and the lower portion 632 of each guide groove 63. In response to the actuating pin 655 reaching this boundary (bent portion), the holding members 61 are placed in the release position, and the two lower portions 632 extend in the up-down direction. This position of the actuating member 65, in (at) which the actuating pin 655 is located at the boundary between the upper portion 631 and the lower portion 632 of each guide groove 63, is hereinafter also referred to as a switching position. In the meantime, the actuating pin 655 also moves downward relative to the locking member 7A (which has been held in the unlocking position), and reaches a position in (at which) the actuating pin 655 abuts on a lower end of each guide groove 703. When the holding members 61 are placed in the release position, as described above, the locking end portions 611 can pass through the through hole 912 of the tool accessory 91. Therefore, at this time, the tool accessory 91 will separate (detach) from the oscillating multi-tool 1A due to its own weight, unless the tool accessory 91 sticks (adheres) to the tool mounting part 57.

When the user further manually pivots the release lever 8 in the unclamping direction, the actuating pin 655 of the actuating member 65 moves downward within the lower portion 632 of each guide groove 63. Therefore, the holding members 61 do not pivot and are held in the release position. In the meantime, the actuating pin 655 pushes down the locking member 7A relative to the spindle 5A by moving downward in abutment with a surface defining the lower end of each guide groove 703. In addition, the lower end of the locking member 7A abuts on the upper surface of the tool accessory 91 and pushes down the tool accessory 91.

As shown in FIGS. 4 and 5, when the release lever 8 is pivoted to the upper position, the actuating pin 655 reaches a lower end portion of the lower portion 632 of the guide groove 63 of each of the holding members 61. The support pin 62 abuts on a surface defining an upper end of each guide groove 701, and the locking member 7A reaches its lowermost position (locking position) and locks the holding members 61 in the release position.

When the tool accessory 91 is oscillated while the tool accessory 91 is strongly pressed against the tool mounting part 57 from below by the holding members 61 with the inclined surface 913 in abutment with the inclined surface 573 (see FIG. 2), it is possible that the tool accessory 91 will stick (adhere) to the tool mounting part 57. In case of such adherence, when the locking member 7A abuts on the tool accessory 91 from above and pushes the tool accessory 91 downward relative to the tool mounting part 57 while moving to the locking position, it will eliminate (break, overcome) any sticking (adhesion) of the tool accessory 91 to the tool mounting part 57. In this embodiment, because the locking member 7A is a hollow cylindrical sleeve, an annular lower end surface of the locking member 7A will come into contact (e.g., plane/surface contact and/or annular contact) with the tool accessory 91 around the claws 612 and push down the tool accessory 91 in an evenly-balanced (annular) manner. Thus, any sticking of the tool accessory 91 to the tool mounting part 57 can be reliably broken, and the tool accessory 91 can be reliably separated from the oscillating multi-tool 1A.

The state in which the tool accessory 91 is detached from the oscillating multi-tool 1A is now described.

In this embodiment, as described above, when the locking member 7A is located in the locking position, the inner peripheral surface of the lower end portion of the locking member 7A is at least substantially in contact with the claws 612 of the holding members 61. Thus, the holding members 61 are locked in the release position.

Figure 8:
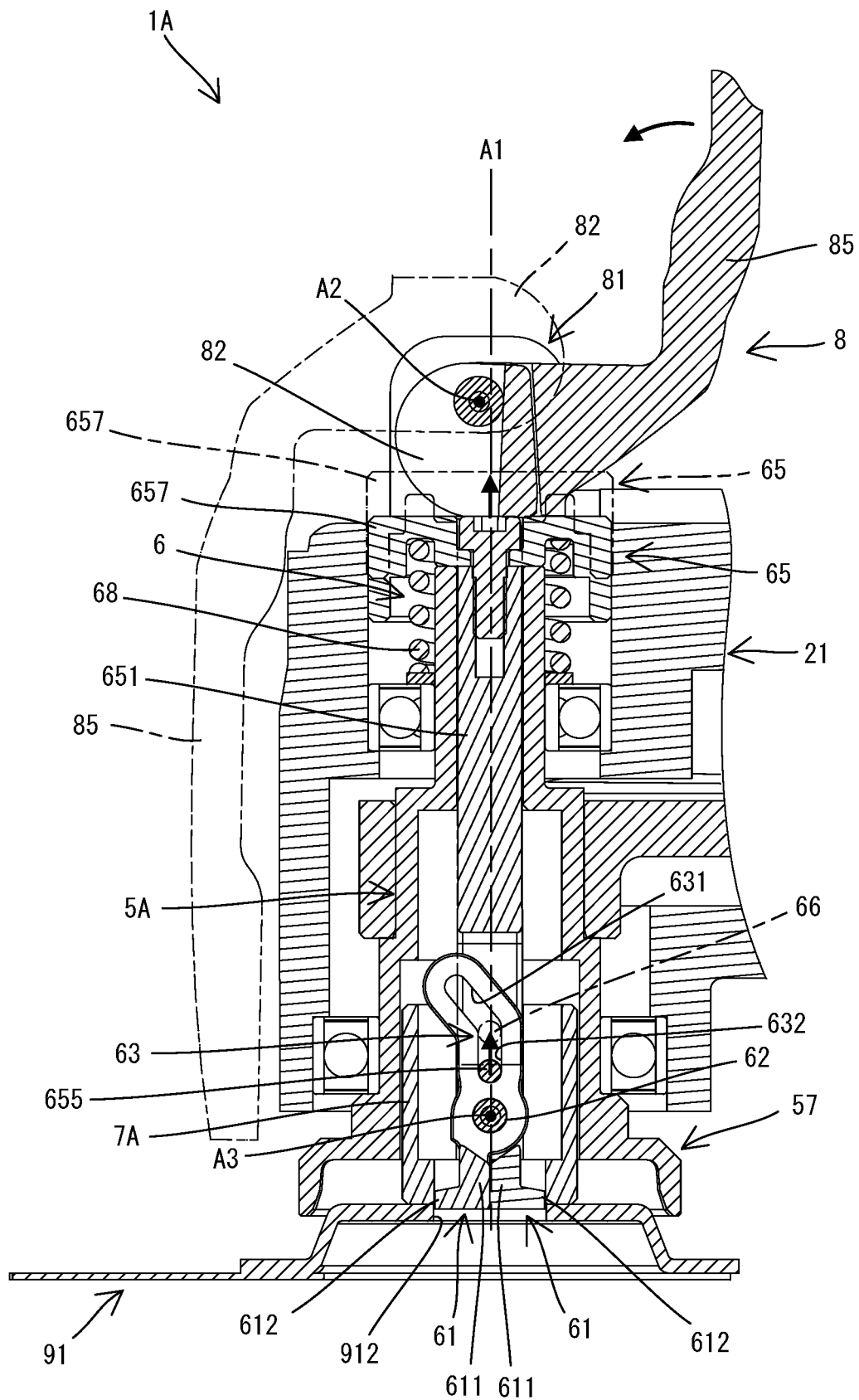
FIG. 8 is a sectional view that corresponds to FIG. 2, for illustrating operations of the oscillating multi-tool when a tool accessory is attached to a spindle.

In this state, as shown by dotted dash lines in FIG. 8, when the user manually pivots the release lever 8 from the upper position back to the initial position, the actuating member 65 is moved upward by the biasing force of the biasing spring 68 while the actuating pin 655 slides within the lower portion 632 of each guide groove 63. During this time, the locking member 7A is held in the locking position by the frictional force of the elastic member (not shown). Therefore, when the actuating pin 655 reaches the boundary (bent part) between the upper portion 631 and the lower portion 632 of each guide groove 63, the holding members 61 will start to pivot in opposite directions such that the locking end portions 611 try to open (become spaced apart). However, the locking member 7A blocks (inhibits, impedes) the holding members 61 from pivoting (i.e., the locking member 7A maintains the locking state) owing to the fact that the ends of the claws 612 radially abut on the locking member 7A. Accordingly, the actuating member 65 cannot further move upward and is held in this position. Further, in response to upward movement of the actuating member 65, the actuating pin 655 moves upward within the guide grooves 703 of the locking member 7A and is placed in the upper end portion of each guide groove 703.

An operation for clamping the tool accessory 91 is now described.

As shown in FIG. 8, the user first positions the tool accessory 91 and places it under the tool mounting part 57. When the user pushes up the tool accessory 91, the locking member 7A also moves upward while the upper surface (specifically, a region around the through hole 912) of the tool accessory 91 abuts on the lower end surface of the locking member 7A. When the claws 612 pass through the through hole 912 and the lower surface of the tool accessory 91 moves upward of the claws 612, the holding members 61 are allowed to pivot toward the fixing position.

The actuating member 65 moves upward relative to the spindle 5A owing to the biasing force of the biasing spring 68, and the holding members 61 pivot to the fixing position while the actuating pin 655 slides within the upper portions 631 of the guide grooves 63. As shown in FIG. 2, the tool accessory 91 is pushed by the holding members 61 up to a position in (at) which the inclined surface 913 abuts on the inclined surface 573 of the tool mounting part 57, and is clamped by the holding members 61 and the tool mounting part 57. In this process, the actuating pin 655 moves upward into abutment with a surface defining an upper end of each guide groove 703 and pulls up the locking member 7A to the unlocking position (i.e., the uppermost position).

As described above, the oscillating multi-tool 1A of this embodiment includes the two holding members 61 for the tool accessory 91 that are configured to be opened and closed (i.e. that are switchable between an open (spaced apart) state and a closed (close together) state). The holding members 61 are biased by the biasing spring 68, via the actuating member 65, toward the fixing position in (at) which the locking end portions 611 (the claws 612) are opened. In the fixing position, the holding members 61 fixedly hold the tool accessory 91 relative to (against) the tool mounting part 57 owing to the biasing force of the biasing spring 68, with the claws 612 locked to (pressed against) the tool accessory 91. In the release position in (at) which the locking end portions 611 (the claws 612) are closed, the holding members 61 are in a close together position that allows the tool accessory 91 to be attached to and detached from the tool mounting part 57. Further, the oscillating multi-tool 1A has the locking member 7A that is configured to lock (hold, maintain) the holding members 61 in the release position by abutting on the claws 612 of the holding members 61 when the locking member 7A is in the locking position. Thus, the locking member 7A can stably retain the holding members 61 in the release position with the claws 612 closed, even though the holding members 61 are biased toward the fixing position (where the claws 612 would be opened or spaced apart).

Particularly, in this embodiment, when the locking member 7A is in the locking position, the locking member 7A is disposed in (on, along) the traveling paths of the claws 612 of the holding members 61 that are located in the release position. Further, the locking member 7A has a hollow cylindrical shape and surrounds the holding members 61 when the locking member 7A is in the locking position. With such a simple structure, the locking member 7A can reliably abut on the claws 612 and lock (hold, maintain) the holding members 61 in the release position.

Further, the locking member 7A is configured to be placed in the locking position after the holding members 61 are placed in the release position. Such timing can prevent the locking member 7A from blocking (inhibiting) the holding members 61 from moving to the release position.

The locking member 7A is configured to move from the locking position to the unlocking position in response to being pressed by the tool accessory 91 when the tool accessory 91 is attached to the tool mounting part 57. In other words, the locked state of the holding members 61 in the release position by the locking member 7A is released (i.e. the holding members 61 are unlocked) in response to (merely by) the user's act of attaching the tool accessory 91 to the tool mounting part 57. As a result, the holding members 61 can then be moved to the fixing position by the biasing force of the biasing spring 68. With such a structure, the tool accessory 91 can be attached with a single manual action (again, the so-called "one-touch operation"), so that the convenience is enhanced.

In this embodiment, the common actuating member 65 (specifically, the common actuating pin 655), which moves linearly in the up-down direction relative to the spindle 5A, causes the holding members 61 to pivot about the rotational axis A3 and also causes the locking member 7A to move in the up-down direction, simply in response to a manual unclamping operation being performed by the user on the release lever 8. Thus, a rational structure is provided that is capable of performing the two functions in response to a simple manipulation without an increase in the part count.

Second Embodiment

An oscillating multi-tool 1B according to a second embodiment is now described with reference to FIGS. 9 to 13. Most of the structures of the oscillating multi-tool 1B of this embodiment are substantially identical (even if slightly different in shape) to those of the oscillating multi-tool 1A (see FIGS. 1 to 3) of the first embodiment. In the oscillating multi-tool 1B, however, a spindle 5B and a locking member 7B have different structures from those of the first embodiment. Structures or elements of the oscillating multi-tool 1B that are substantially identical to those of the first embodiment are given the same reference numerals as in the first embodiment, and are omitted or simplified in the drawings and the following description, and different structures from the first embodiment and their operations are now mainly described.

Figure 9:
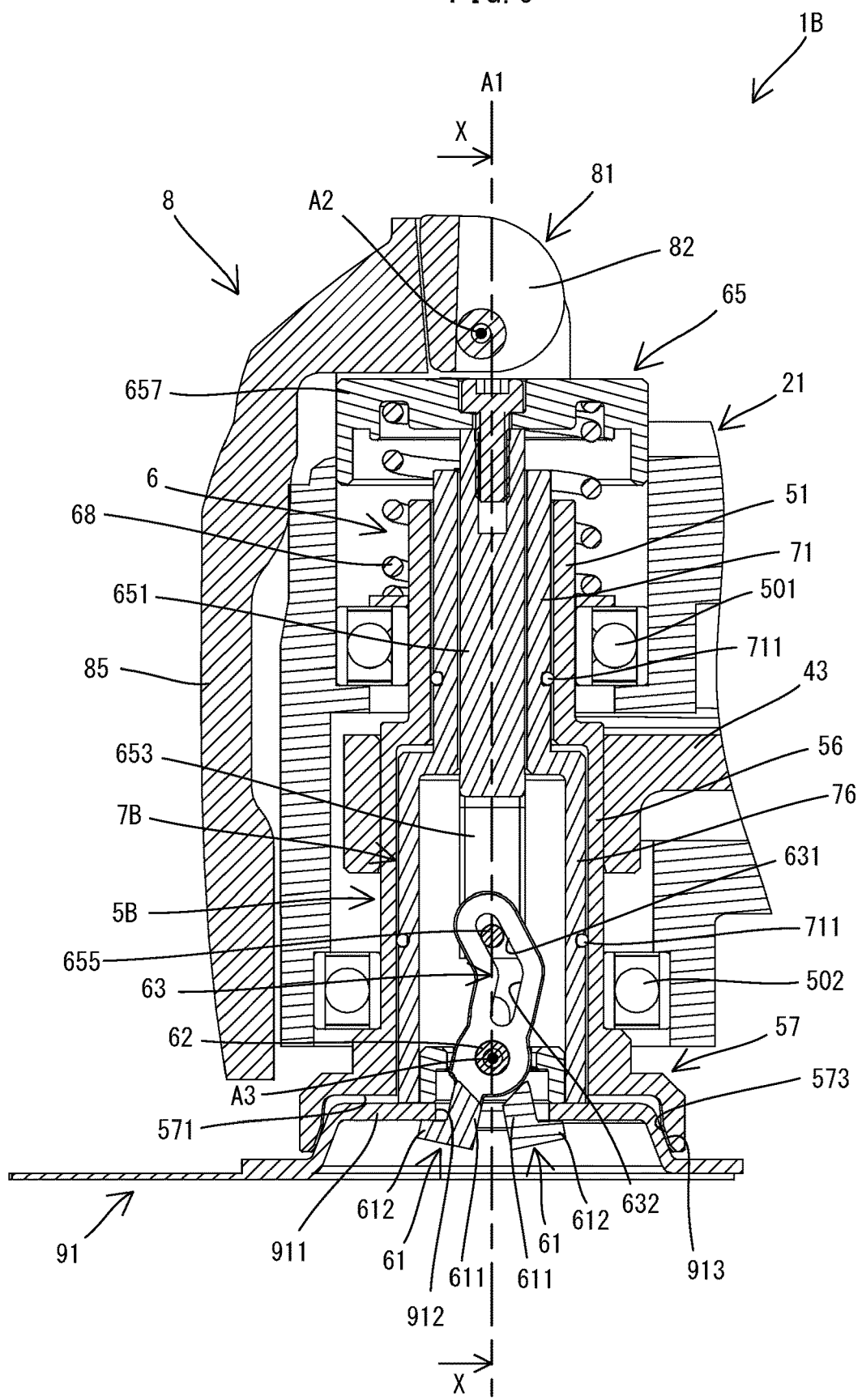
FIG. 9 is a sectional view showing an oscillating multi-tool according to a second embodiment, wherein an actuating member is located in a clamping position.
Figure 10:
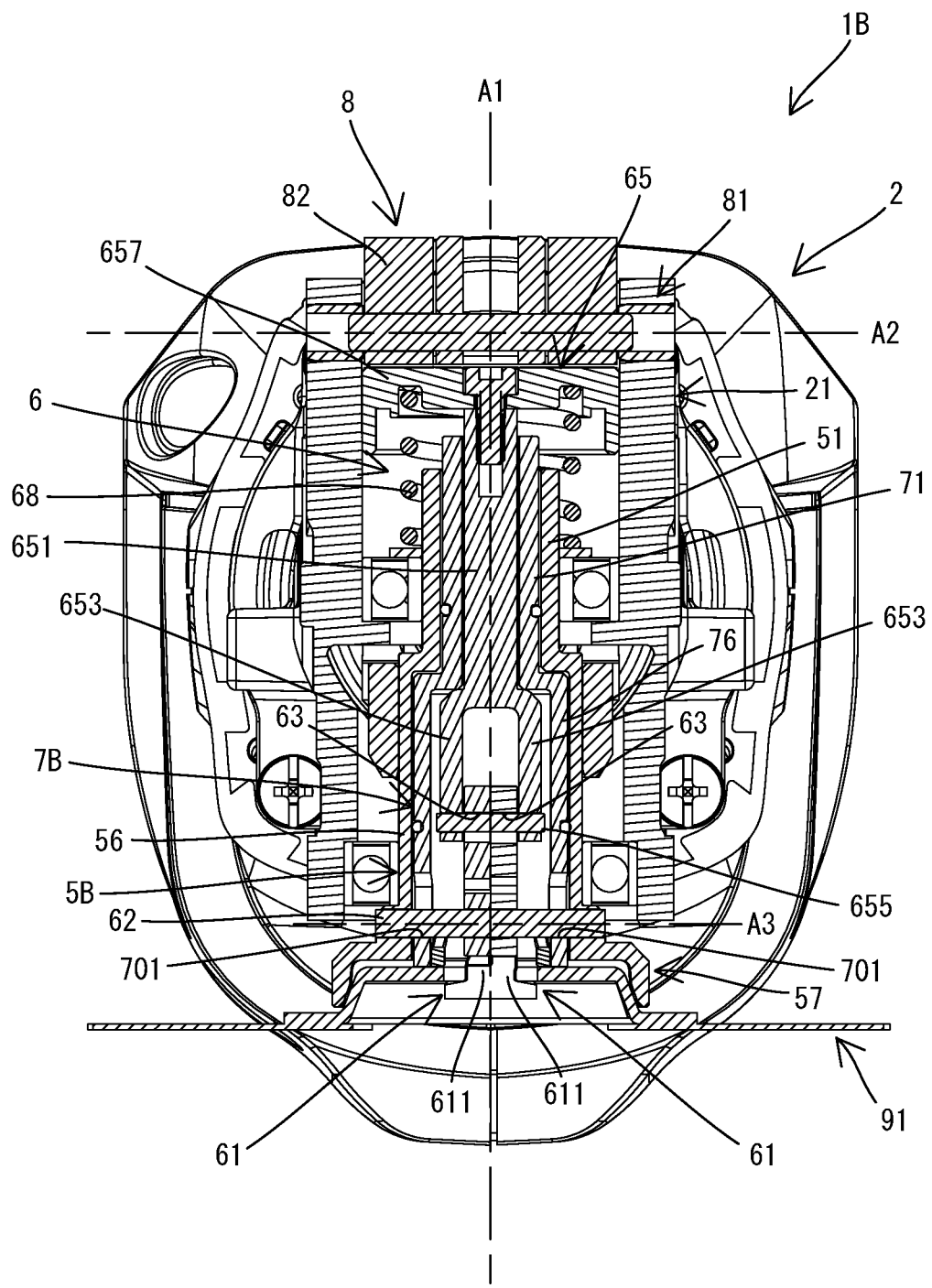
FIG. 10 is a sectional view taken along line X-X in FIG. 9.

As shown in FIGS. 9 and 10, in the oscillating multi-tool 1B of the second embodiment, the spindle 5B, the tool holding mechanism 6 and the locking member 7B are housed in the front part 21 of the housing 2.

The spindle 5B is a hollow stepped cylindrical member. The spindle 5B is supported to be rotatable (pivotable) around the driving axis A1 relative to the housing 2. The spindle 5B of this embodiment includes the small-diameter part 51 having the smallest diameter, a large-diameter part 56 having a larger diameter than the small-diameter part 51 and the flange-like tool mounting part 57 in this order from the top. The support pin 62 pivotably supports the holding members 61 and is supported above the tool mounting part 57 at a lower end portion of the large-diameter part 56.

In this second embodiment, the locking member 7B is a hollow stepped cylindrical member. The locking member 7B includes a small-diameter part 71 and a large-diameter part 76 having a larger diameter than the small-diameter part 71. The small-diameter part 71 and the large-diameter part 76 are respectively disposed within the small-diameter part 51 and the large-diameter part 56 of the spindle 5B. The locking member 7B is slidable in the up-down direction along the driving axis A1 relative to the spindle 5B. The small-diameter part 71 of the locking member 7B is longer than the small-diameter part 51 of the spindle 5B. An upper end portion of the locking member 7B is capable of protruding from an upper end of the spindle 5B. An annular elastic member 711 is fitted around an outer periphery of the locking member 7B to generate a frictional sliding resistance.

In this second embodiment, the actuating member 65 is inserted in the locking member 7B, which is inserted in the spindle 5B, such that the actuating member 65 is movable in the up-down direction relative to the spindle 5B. More specifically, the shaft part 651 of the actuating member 65 extends through the small-diameter part 71 of the locking member 7B and is slidable in the up-down direction along an inner peripheral surface of the small-diameter part 71. Further, the support arms 653 and portions of the holding members 61 are disposed within the large-diameter part 76 and are movable in the up-down direction within the large-diameter part 76.

Thus, in this embodiment, the locking member 7B and the actuating member 65 are also movable relative to each other in the up-down direction. However, although the locking member 7A (see FIGS. 2 and 3) of the first embodiment is pushed down by the actuating pin 655 while the actuating member 65 moves downward relative to the spindle 5A, the locking member 7B of the second embodiment is configured to be pushed down by the spring receiving part 657 while the actuating member 65 moves downward relative to the spindle 5B. Therefore, the locking member 7B does not have one or two guide grooves for the actuating pin 655.

Like the locking member 7A, the locking member 7B is configured to lock the holding members 61 in the release position. Therefore, a lower end portion of the locking member 7B is also configured to abut on the claws 612 when the lower portion is placed radially outward of the locking end portions 611 of the holding members 61 that are located in the release position. Further, like the locking member 7A, the two guide grooves 701 are formed in a lower portion of the locking member 7B. The support pin 62, which is supported by the spindle 5B, is slidably inserted in the guide grooves 701. Therefore, in this second embodiment, the locking member 7B is also movable in the up-down direction relative to the spindle 5B between the unlocking position, in (at) which the locking member 7B allows the holding members 61 to pivot, and the locking position, in (at) which the locking member 7B locks (holds, maintains) the holding members 61 in the release position.

Figure 11:
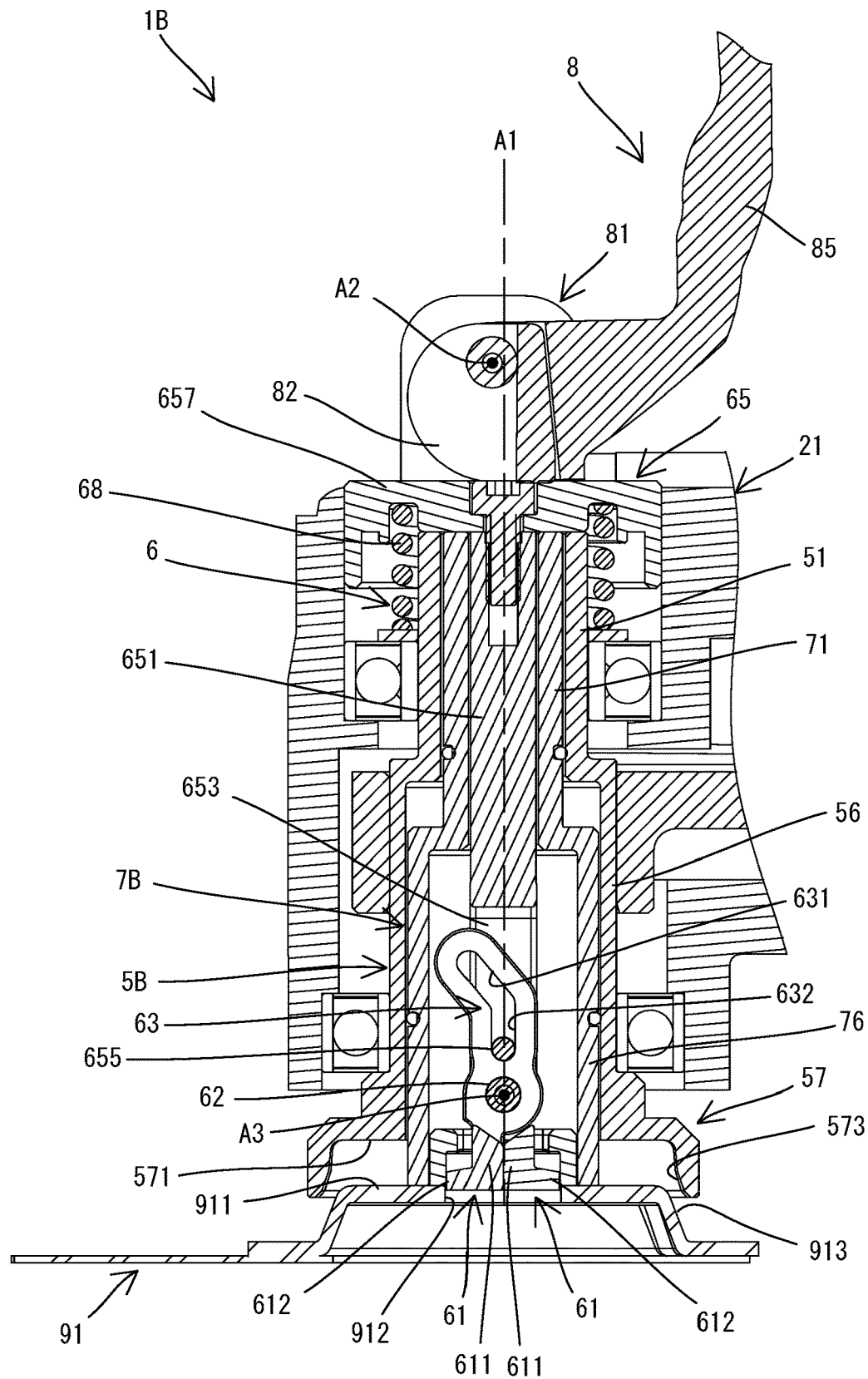
FIG. 11 is a sectional view that corresponds to FIG. 9, wherein the actuating member is located in a lowermost position.
Figure 12:
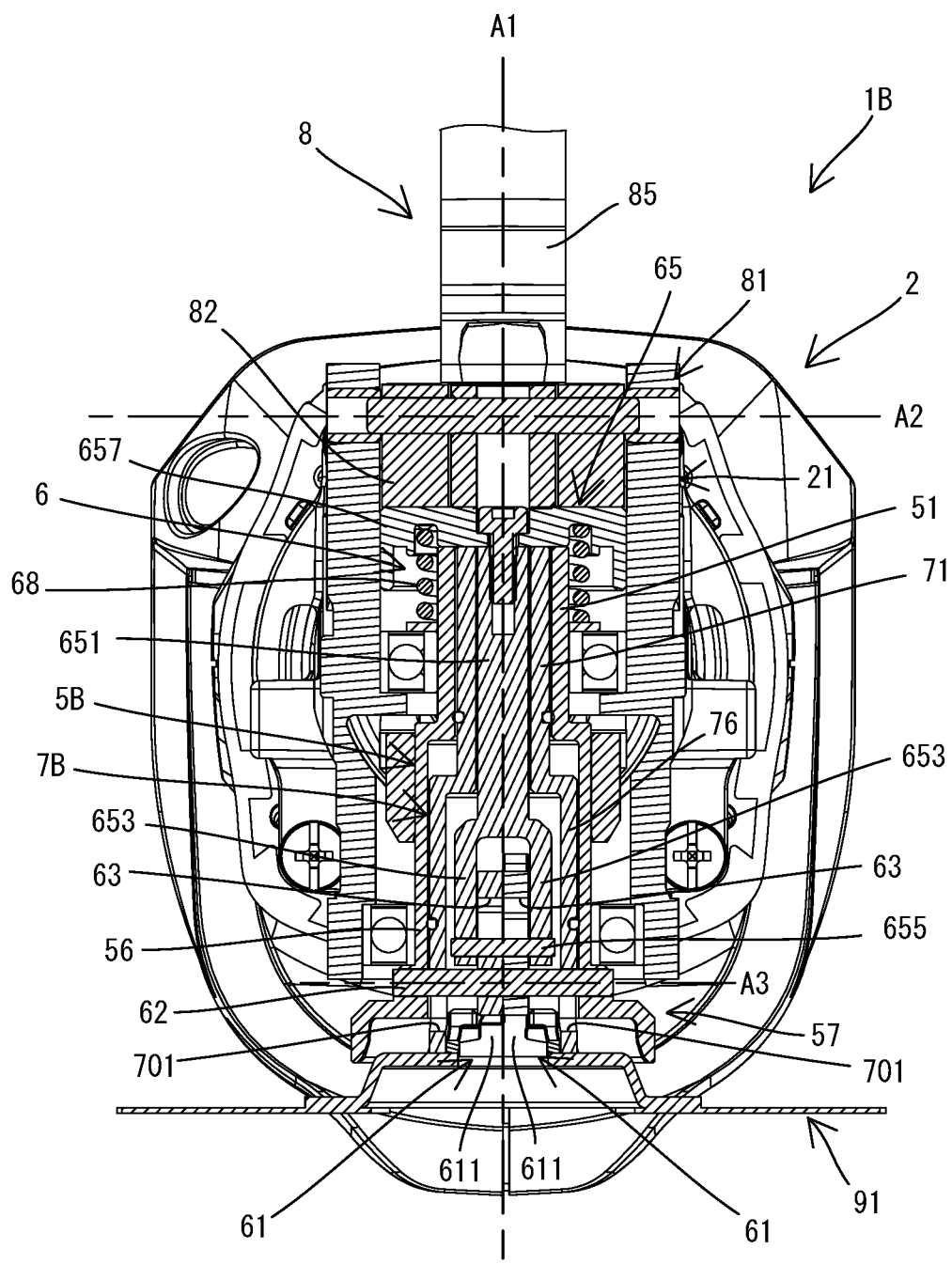
FIG. 12 is a sectional view that corresponds to FIG. 10, wherein the actuating member is located in the lowermost position.

As shown in FIGS. 9 and 10, when the locking member 7B is located in the unlocking position, the upper end portion of the locking member 7B (the small-diameter part 71) protrudes upward from the upper end of the spindle 5B (the small-diameter part 51). Furthermore, a lower end of the locking member 7B is in contact with the upper surface of the clamped tool accessory 91. As shown in FIGS. 11 and 12, when the locking member 7B is located in the locking position, an upper end of the locking member 7B (the small-diameter part 71) is located substantially at the same level as the upper end of the spindle 5B (the small-diameter part 51) in the up-down direction. Further, the lower end of the locking member 7B is located slightly above the lower end of the tool mounting part 57 within the recess 571.

In the oscillating multi-tool 1B of this second embodiment, the actuating member 65, the holding members 61 and the locking member 7B are also interlocked (operably coupled) with each other to unclamp and push down the tool accessory 91 in response to an unclamping operation being performed on the release lever 8, as well as to enable the tool accessory 91 to be attached with a single manual action (again, the so-called "one-touch operation"). Operations of the oscillating multi-tool 1B, including operations of the actuating member 65, the holding members 61 and the locking member 7B, are now described. However, descriptions of substantially the same operations as in the oscillating multi-tool 1A will be omitted or simplified.

First, the state in which the tool accessory 91 is clamped is described.

As shown in FIGS. 9 and 10, the actuating member 65 is biased upward by the biasing spring 68 and held in the clamping position. At this time, the release lever 8 is located in the (its) initial position, and the eccentric part 82 of the rotary shaft 81 is spaced slightly apart upward from the upper end of the actuating member 65. The locking member 7B is held in the unlocking position by the frictional force of the elastic member 711, while the lower end of the locking member 7B is in abutment with the upper surface of the clamped tool accessory 91. Further, an upper end portion of the shaft part 651 of the actuating member 65, which is located in the clamping position, protrudes upward from the upper end of the locking member 7B, which is located in the unlocking position. The actuating pin 655 is located in the upper portion 631 of the guide groove 63 of each of the holding members 61. In this state, the holding members 61 are held in the fixing position by the biasing force of the biasing spring 68 and clamp the tool accessory 91 in cooperation with the tool mounting part 57.

An operation for detaching the tool accessory 91 is now described.

In order to detach the tool accessory 91, the user manually pivots the release lever 8 in the unclamping direction by performing an unclamping operation on the manipulation part 85. In response to the unclamping operation, the eccentric part 82 of the rotary shaft 81 abuts on the upper end of the actuating member 65 (the spring receiving part 657) and moves the actuating member 65 downward relative to the spindle 5B, while compressing the biasing spring 68. In response to the downward movement of the actuating member 65, the actuating pin 655 causes the holding members 61 to pivot toward the release position, while sliding within the upper portion 631 of the guide grooves 63. The locking member 7B is held in the unlocking position by the frictional force of the elastic member 711 while a lower surface of the spring receiving part 657 of the actuating member 65 is spaced apart from an upper end surface of the locking member 7B.

Figure 13:
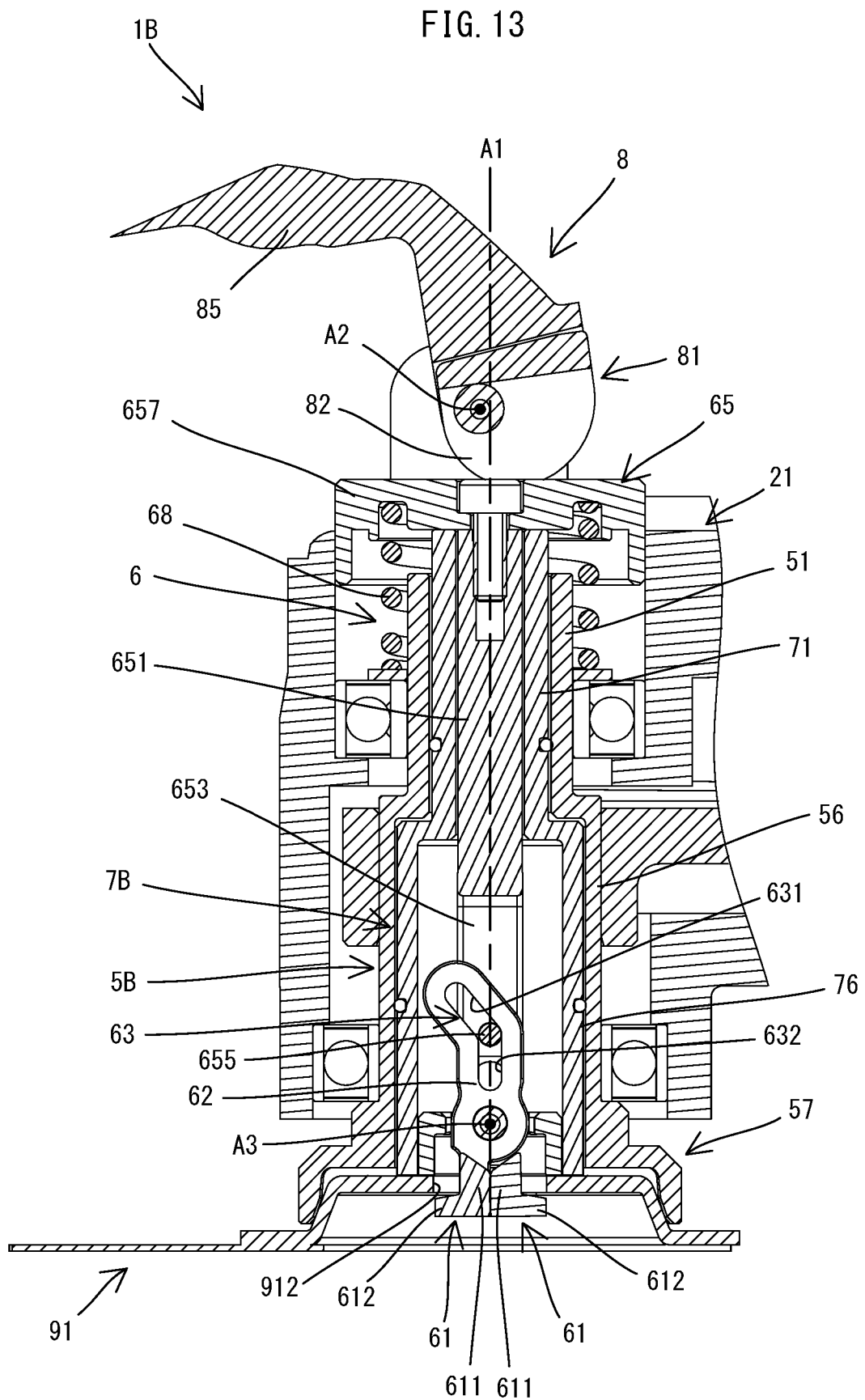
FIG. 13 is a sectional view that corresponds to FIG. 9, wherein the actuating member is located in a switching position.

As shown in FIG. 13, the actuating pin 655 of the actuating member 65 moves downward relative to the spindle 5B while pivoting the holding members 61, and reaches the switching position. In response to the actuating member 65 reaching the switching position, the holding members 61 are placed in the release position and both of the lower portions 632 extend in the up-down direction. Further, the lower surface of the spring receiving part 657 of the actuating member 65 abuts on the upper end surface of the locking member 7B from above.

When the user further manually pivots the release lever 8 in the unclamping direction, the actuating pin 655 of the actuating member 65 moves downward within the lower portion 632 of the guide grooves 63. Therefore, the holding members 61 are held in the release position without being pivoted. In the meantime, the actuating member 65 pushes down the locking member 7B relative to the spindle 5B by moving downward with the lower surface of the spring receiving part 657 into abutment with the upper end surface of the locking member 7B. By moving downward, the locking member 7B also pushes down the tool accessory 91 owing to the abutment of its lower end on the upper surface of the tool accessory 91, thereby breaking (eliminating, overcoming) any sticking (adhesion) of the tool accessory 91 to the tool mounting part 57.

As shown in FIGS. 11 and 12, when the release lever 8 is pivoted to the upper position, the actuating pin 655 reaches the lower end portion of the lower portion 632 of the guide groove 63 of each of the holding members 61. The support pin 62 abuts on a surface defining the upper end of each guide groove 701, and the locking member 7B reaches the lowermost position (locking position) and locks the holding member 61 in the release position.

The state in which the tool accessory 91 is detached from the oscillating multi-tool 1B is similar to that in the first embodiment. Specifically, when the user manually pivots the release lever 8 back to the initial position, the actuating member 65 moves upward to the switching position owing to the biasing force of the biasing spring 68. During this time, the locking member 7B is held in the locking position by the frictional force of the elastic member 711. Therefore, when the actuating pin 655 reaches the switching position, the locking member 7A blocks (inhibits, impedes) the holding members 61 from pivoting toward the fixing position. Accordingly, the actuating member 65 is held in the switching position.

An operation for clamping the tool accessory 91 is now described.

As shown in FIG. 11, when the user positions the tool accessory 91 and pushes up the tool accessory 91, the locking member 7B also moves upward because the upper surface of the tool accessory 91 abuts on the lower end surface of the locking member 7B. When the lower surface of the tool accessory 91 moves upward of the claws 612, the holding members 61 are allowed (released) to pivot toward the fixing position.

The actuating member 65 then moves upward owing to the biasing force of the biasing spring 68, and the holding members 61 are pivoted to the fixing position. As shown in FIG. 9, the tool accessory 91 is pushed by the holding members 61 up to a position where the inclined surface 913 abuts on the inclined surface 573 of the tool mounting part 57, and is clamped by the holding members 61 and the tool mounting part 57. The locking member 7B is placed in the unlocking position.

As described above, like the oscillating multi-tool 1A of the first embodiment, the oscillating multi-tool 1B of this second embodiment also includes the locking member 7B that is configured to lock the holding members 61 in the release position by abutting on the claws 612 of the holding members 61 when the locking member 7B is in the locking position. Thus, the locking member 7B can stably retain (hold, block) the holding members 61 in the release position with the claws 612 closed (in the close together position), even though the holding members 61 are biased toward the fixing position (where the claws 612 would be opened or spaced apart).

In addition, in this embodiment, the locking member 7B is pushed down to the locking position by the spring receiving part 657 of the actuating member 65 that abuts on the upper end surface of the locking member 7B in response to an unclamping operation being performed on the release lever 8 by the user. Thus, in this embodiment, a force from the release lever 8 acts on the upper end surface of the locking member 7B. Therefore, the structure can be simplified compared with an embodiment in which the actuating member 65 and the locking member 7B are connected by the actuating pin 655.

Correspondences between the features of the above-described embodiments and the features of the disclosure are as follows. The features of the above-described embodiments are merely exemplary and do not limit the features of the present disclosure or the present invention. The oscillating multi-tools 1A, 1B are examples of the "power tool". The tool accessory 91 is an example of the "tool accessory". The spindles 5A, 5B are examples of the "spindle". The tool mounting part 57 is an example of the "tool mounting part". The driving axis A1 is an example of the "driving axis". The holding members 61 are examples of the "holding members" and the "tool accessory holders". The claws 612 are examples of the "claws" and the "clamping surfaces". The fixing position and the release position of the holding member 61 are examples of the "first position" and the "second position", respectively. The actuating member 65 and the biasing spring 68 as a whole are an example of the "moving mechanism". The locking members 7A, 7B are examples of the "locking member" and the "sleeve". The locking position and the unlocking position of the locking member 7A, 7B are examples of the "locking position" (or "blocking position") and the "unlocking position" (or "non-blocking position"), respectively. The biasing spring 68 is an example of the "biasing member". The actuating member 65 and the actuating pin 655 are examples of the "actuating member" and the "actuating part", respectively. The release lever 8 is an example of the "manually operable member".

The above-described embodiments are merely exemplary embodiments of the disclosure and power tools according to the present disclosure is not limited to the oscillating multi-tools 1A, 1B of the above-described embodiments. For example, the following modifications may be made. Further, one or more of these modifications may be employed in combination with any one of the oscillating multi-tools 1A, 1B of the above-described embodiments and the claimed features.

The holding members that are configured to fixedly hold the tool accessory 91 relative to the tool mounting part 57 are not limited to the holding members 61. The shape, number and arrangement of the holding members 61 may be appropriately changed. For example, three or more of the holding members may be used to hold (lock, retain) the tool accessory 91. Further, in the above embodiments, the two holding members 61 are supported to be pivotable about the common rotational axis A3, but, for example, the holding members may be linearly movable in the radial direction relative to the driving axis A1 between the fixing position and the release position. For example, two holding members may be disposed such that their respective claws protrude away from each other. The two holding members may be placed in the fixing position by moving away from each other further outward in the radial direction, and may be placed in the release position by moving toward each other further inward in the radial direction.

The mechanism that is configured to move the holding members for the tool accessory 91 between the fixing position and the release position is not limited to the actuating member 65 and the biasing spring 68. The shape of the actuating member 65, the manner of the connection between the actuating member 65 and the holding members 61 and the kind and arrangement of the biasing spring 68 may be appropriately changed. For example, a pivotable actuating member may be employed that is configured to pivot the holding members 61. The holding members 61 may be pivotably (rotatably) biased toward the fixing position directly by one or more torsion springs, instead of being biased by the biasing spring (compression spring) 68 via the actuating member 65. Alternatively, the biasing spring 68 may be a tension spring or a disc spring. The biasing spring 68 may be disposed inside the spindle 5A, 5B.

The shape, number, arrangement and holding manner of the locking member 7A, 7B that is configured to lock the holding members for the tool accessory 91 in the release position may also be appropriately changed. For example, in a modified embodiment, two locking members may be employed that are respectively configured to be placed in (on, along) the respective paths along which the claws 612 of the two holding members 61 move from the release position toward the fixing position and to abut on the claws 612 when the two locking members are located in the locking position. In this modified embodiment, the two locking members may be movable in the up-down direction or in the radial direction between the locking position and the unlocking position. Alternatively, the two locking members may be pivotable around the driving axis A1 between the locking position and the unlocking position. Further, the number of the holding members for the tool accessory 91 and the number of the locking members do not have to be the same.

Further, the above-described locking member 7A, 7B is configured to, in the locking position, at least substantially abut on the claws 612 and hold the holding members 61 such that the holding members 61 are substantially immovable from the release position. However, it is also acceptable that the locking member 7A, 7B substantially holds the holding members 61 in the release position while allowing slight displacement of the holding members 61 from the release position.

In the first embodiment, the common actuating pin 655 is employed to pivot the holding members 61 and to move the locking member 7A. However, for example, in addition to the actuating pin 655 for pivoting the holding members 61, the actuating member 65 may be provided with a structure (for example, a projection) for pushing down the locking member 7A. Further, in the above-described embodiments, the locking member 7A, 7B is placed in the locking position after the holding members 61 are placed in the release position, but the locking member 7A, 7B may be placed in the locking position substantially at the same time as the holding members 61 are placed in the release position.

In the second embodiment, a force from the eccentric part 82 of the release lever 8 acts on the locking member 7B via the spring receiving part 657 of the actuating member 65. The actuating member 65 and the locking member 7B may be configured such that the eccentric part 82 of the release lever 8 directly abuts on the actuating member 65 and the upper end surface of the locking member 7B. Further, the release lever 8 may have a first eccentric part (a first cam) that is configured to abut on the actuating member 65, and a second eccentric part (a second cam) that is configured to abut on and push down the locking member 7B after the first eccentric part starts pushing down the actuating member 65. The upper end portion of the locking member 7B that receives a force from the release lever 8 does not have to have a hollow cylindrical shape. For example, the locking member 7B may have at least one projection that protrudes from the upper end of the spindle 5B when the locking member 7B is in the unlocking position. An upper end surface of the projection may receive the force from the release lever 8 via the spring receiving part 657.

The release lever 8 may be pivotable around a rotational axis (pivot axis) that extends not in the left-right direction but in the front-rear direction. Alternatively, the release lever 8 may be pivotable around the driving axis A1. In another alternative embodiment, the release lever 8 may be a manually operable member that is not a rotary (pivotable) lever, but may be linearly movable in the up-down direction and configured to move the actuating member 65 (and the locking member 7B) by moving downward in response to an external manipulation by the user.

The structures (the shapes, arrangements and supporting manners) of the housing 2, the motor 3, the driving mechanism 4 and the spindle 5A, 5B may be appropriately changed according to or regardless of the above-described modifications. For example, the housing 2 may be a so-called vibration-isolating housing that includes an inner housing that houses the motor 3, the driving mechanism 4 and the spindle 5A, 5B and an outer housing that is elastically connected to the inner housing. The motor 3 may be a brushless motor. The motor 3 may be housed within the front part 21 such that the rotational axis of the motor shaft 31 extends in parallel to the driving axis A1. Further, for example, the oscillating multi-tool 1A, 1B may be configured to be powered not by the battery 93 but rather by an external commercial power source, such as an AC mains power supply.

Further, in view of the nature of the present disclosure, the above-described embodiments and the modifications thereto, the following Aspects 1 to 8 are provided. Any one of the Aspects 1 to 8 can be employed alone or in combination with any one of the oscillating multi-tools 1A, 1B of the above-described embodiments, the above-described modifications and the claimed features.

(Aspect 1)

The holding members include two holding members that are supported to be pivotable in opposite directions to each other around a common rotational axis.

(Aspect 2)

At least a portion of the actuating member is coaxially disposed inside the spindle.

(Aspect 3)

At least a portion of the actuating member is disposed inside the locking member.

(Aspect 4)

The biasing member is configured to bias the holding members via the actuating member.

(Aspect 5)

In Aspect 4, the oscillating multi-tool further comprises a manually operable member that is configured to be externally manipulated by a user, and the actuating member is configured to be held in (at) a specified (predetermined) position by an upward biasing force of the biasing member when the holding members are located in the first position, and to move downward from the specified position against the biasing force of the biasing member in response to an unclamping operation being performed on the manually operable member by the user.

(Aspect 6)

The holding members include two holding members that are supported to be pivotable in opposite directions to each other around a common rotational axis, each of the holding members has a groove formed on an opposite side from the claw with respect to the rotational axis, the actuating member has an actuating part that is disposed within the respective grooves of the two holding members, and the actuating part is configured to cause the two holding members to pivot while sliding within the grooves in response to movement of the actuating member in the up-down direction.

The guide grooves 63 are an example of the "groove" in Aspect 6.

(Aspect 7)

In Aspect 6, the groove includes a first portion that linearly extends in the up-down direction when the holding members are in the second position, and a second portion that linearly extends obliquely upward relative to the first portion from an upper end of the first portion, the actuating part is configured to cause the holding members to pivot about the rotational axis while sliding within the second portion, and the actuating part is configured to cause the locking member to move downward from the unlocking position to the locking position while moving downward within the first portion.

The lower portion 632 and the upper portion 631 of the guide groove 63 are examples of the "first portion" and the "second portion", respectively, in Aspect 7.

(Aspect 8)

The actuating member includes a shaft part that extends through the locking member so as to be coaxial with the locking member, the biasing member biases the holding members via the actuating member, the actuating member is held in a specified position by an upward biasing force of the biasing member when the holding members are located in the first position, an upper end of the shaft part of the actuating member held in the specified position is located above an upper end of the locking member, and the manually operable member is configured to push down the actuating member from the specified position against the biasing force in response to the unclamping operation and to further push down the actuating member and the locking member when the upper end of the shaft part reaches the same level as the upper end of the locking member in the up-down direction.

(Aspect 9)

The holding members are configured to be moved toward the first position by the biasing force while the locking member moves from the locking position toward the unlocking position by being pressed by the tool accessory.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools that drive a tool accessory with a pivotal oscillating motion.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

DESCRIPTION OF THE REFERENCE NUMERALS

1A, 1B: oscillating multi-tool, 2: housing, 21: front part, 22: rear part, 23: grip part, 26: switch, 261: manipulation part, 27: battery mounting part, 3: motor, 31: motor shaft, 4: driving mechanism, 41: eccentric shaft, 43: oscillating arm, 45: drive bearing, 5A, 5B: spindle, 51: small-diameter part, 53: medium-diameter part, 55: large-diameter part, 56: large-diameter part, 57: tool mounting part, 571: recess, 573: inclined surface, 501: bearing, 502: bearing, 6: tool holding mechanism, 61: holding member, 611: locking end portion, 612: claw, 62: support pin, 63: guide groove, 631: upper portion, 632: lower portion, 65: actuating member, 651: shaft part, 653: support arm, 655: actuating pin, 657: spring receiving part, 68: biasing spring, 7A, 7B: locking member, 701: guide groove, 703: guide groove, 71: small-diameter part, 711: elastic member, 76: large-diameter part, 8: release lever, 81: rotary shaft, 82: eccentric part, 85: manipulation part, 91: tool accessory, 911: protruding part, 912: through hole, 913: inclined surface, 93: battery

What is claimed is:

1. A power tool configured to perform a processing operation on a workpiece by driving a tool accessory in an oscillating manner, the power tool comprising:

a spindle configured to be driven about a driving axis with a pivotal oscillating motion within a specified angle range, the driving axis defining an up-down direction of the power tool, and a tool mounting part to which the tool accessory is removably attachable being defined at a lower end portion of the spindle;

a plurality of holding members each having a claw, the holding members being movable relative to each other between a first position in which the claws of the holding members are located farther apart from each other and a second position in which the claws of the holding members are located closer to each other than in the first position;

a biasing member generating a biasing force imparted to the holding members to urge the holding members toward the first position; and a locking member configured to move between a locking position and an unlocking position, wherein:

when the holding members are in the first position, the holding members fixedly hold the tool accessory against the tool mounting part with the claws pressed against the tool accessory owing to the biasing force of the biasing member, when the holding members are in the second position, the holding members do not impede or block attachment of the tool accessory on the tool mounting part or detachment of the tool accessory from the tool mounting part, when the locking member is in the locking position, the locking member abuts on the claws of the holding members to hold the holding members in the second position, and when the locking member is in the unlocking position, the locking member does not impede or block the holding members from moving from the second position to the first position.

2. The power tool as defined in claim 1, wherein, when the locking member is in the locking position, the locking member is disposed in traveling paths of the claws of the holding members along which the claws travel from the second position toward the first position.

3. The power tool as defined in claim 2, wherein:

the locking member has a hollow cylindrical shape, and when the locking member is in the locking position, the locking member surrounds and blocks the holding members located in the second position.

4. The power tool as defined in claim 1, wherein the locking member is configured to move in the up-down direction relative to the spindle between the locking position and the unlocking position.

5. The power tool as defined in claim 4, wherein the locking member is configured to push down the tool accessory while moving downward from the unlocking position to the locking position.

6. The power tool as defined in claim 4, further comprising a moving mechanism that includes the biasing member and an actuating member that is supported to be movable in the up-down direction relative to the spindle and that is configured to cause the holding members to move between the first position and the second position while moving in the up-down direction.

7. The power tool as defined in claim 6, wherein the actuating member is configured to cause the locking member to move in the up-down direction relative to the spindle while moving in the up-down direction.

8. The power tool as defined in claim 7, wherein:
the actuating member has an actuating part that is movably coupled to the holding members and the locking member, and
the actuating part is configured to move the holding members and the locking member while the actuating member is moving in the up-down direction.

9. The power tool as defined in claim 8, wherein:
when the locking member is in the locking position, the locking member is disposed in traveling paths of the claws of the holding members along which the claws travel from the second position toward the first position such that the locking member surrounds and blocks the claws to maintain the holding members in the second position or near the second position, and
the locking member has a hollow cylindrical shape, is coaxially inserted in the spindle and is configured to push down the tool accessory away from the tool mounting part while moving downward from the unlocking position to the locking position.

10. The power tool as defined in claim 9, further comprising:
a manually operable member configured to be externally manipulated by a user to move the moving mechanism and thereby cause the holding members to move to the second position,
wherein:
when the locking member is in the unlocking position, an upper end surface of the locking member is located above an upper end of the spindle, and
the locking member is configured to move downward toward the locking position in response to receiving a force applied to the upper end surface of the locking member from the manually operable member when the manually operable member is externally manipulated by the user.

11. The power tool as defined in claim 10, wherein the locking member is configured to be placed in the locking position substantially at the same time as or after the holding members are placed in the second position.

12. The power tool as defined in claim 11, wherein the locking member is configured to move from the locking position toward the unlocking position by being pressed by the tool accessory when the tool accessory is attached to the tool mounting part.

13. The power tool as defined in claim 4, further comprising:
a manually operable member configured to be externally manipulated by a user to move the holding members to the second position,
wherein:
when the locking member is in the unlocking position, an upper end surface of the locking member is located above an upper end of the spindle, and
the locking member is configured to move downward toward the locking position in response to receiving a force applied to the upper end surface of the locking member from the manually operable member when the manually operable member is externally manipulated by the user.

14. The power tool as defined in claim 13, wherein the locking member is a hollow cylindrical member that is coaxially inserted in the spindle.

15. The power tool as defined in claim 1, wherein the locking member is configured to be placed in the locking position substantially at the same time as or after the holding members are placed in the second position.

16. The power tool as defined in claim 1, wherein the locking member is configured to move from the locking position toward the unlocking position by being pressed by the tool accessory when the tool accessory is attached to the tool mounting part.

17. A power tool comprising:
a spindle configured to be driven about a driving axis with a pivotal oscillating motion within a specified angle range, the driving axis defining an up-down direction of the power tool,
a tool mounting part defined at a lower end portion of the spindle in the up-down direction and configured to contact a tool accessory;
a plurality of tool accessory holders partially disposed within the spindle, each of the tool accessory holders having a tool accessory clamping surface that is movable between a first position and a second position;
a biasing member that generates a biasing force imparted to the tool accessory holders to urge the tool accessory clamping surfaces toward the first position; and
a sleeve disposed coaxially with the spindle;
wherein:
the tool accessory clamping surfaces are spaced farther apart from each other in the first position than in the second position,
in the first position, the tool accessory clamping surfaces are configured to press and hold the tool accessory against the tool mounting part utilizing the biasing force of the biasing member,
in the second position, the tool accessory holders do not impede or block the tool accessory from being attached to or detached from the tool mounting part,
the sleeve and the tool accessory holders are movable relative to each other between a blocking position and a non-blocking position,
in the blocking position, the sleeve impedes or blocks the tool accessory clamping surfaces from moving from the second position to the first position,
in the non-blocking position, the sleeve does not impede or block the tool accessory clamping surfaces from moving to the first position, and
the sleeve is configured to move in the up-down direction relative to the spindle between the blocking position and the non-blocking position while the sleeve and the tool accessory holders move relative to each other.

18. The power tool as defined in claim 17, wherein, when the sleeve is in the blocking position, the sleeve is disposed in traveling paths of the tool accessory holders along which the tool accessory holders travel from the second position toward the first position.

19. The power tool as defined in claim 17, wherein:
the sleeve has a hollow cylindrical shape, and
when the sleeve is in the blocking position, the sleeve surrounds and blocks the tool accessory holders located in the second position or substantially in the second position.

20. The power tool as defined in claim 17, wherein the sleeve is configured to move in the up-down direction relative to the tool accessory holders.

* * * * *